United States Patent
Solinsky et al.

(10) Patent No.: US 9,922,522 B2
(45) Date of Patent: *Mar. 20, 2018

(54) DEVICE AND METHOD FOR CONTAINING A SUBJECT USING SATELLITE POSITIONING DATA

(71) Applicant: OnPoint Systems, LLC, Bedford, NH (US)

(72) Inventors: Kenneth S. Solinsky, Bedford, NH (US); Robert Paxton, Bedford, NH (US); Xinnakone Vivathana, Stratham, NH (US); Kristen Lomastro, Dover, NH (US); Scott Sterling, Boston, MA (US)

(73) Assignee: OnPoint Systems, LLC, Bedford, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/482,354

(22) Filed: Apr. 7, 2017

(65) Prior Publication Data
US 2017/0372581 A1    Dec. 28, 2017

Related U.S. Application Data

(63) Continuation of application No. 15/190,301, filed on Jun. 23, 2016, now Pat. No. 9,654,925.

(51) Int. Cl.
*G08G 1/08*       (2006.01)
*G08B 21/02*    (2006.01)

(52) U.S. Cl.
CPC ..... *G08B 21/0261* (2013.01); *G08B 21/0269* (2013.01); *G08B 21/0277* (2013.01)

(58) Field of Classification Search
CPC .. H04W 4/021; H04W 4/008; G08B 21/0269; G08B 21/0277

(Continued)

(56) References Cited

U.S. PATENT DOCUMENTS 5,868,100 A  *  2/1999  Marsh .................. A01K 15/023
                                                                119/421
6,581,546 B1 *  6/2003  Dalland ............... A01K 15/023
                                                                119/712
(Continued)

FOREIGN PATENT DOCUMENTS

EP         2973471 A1      1/2016

OTHER PUBLICATIONS

International Search Report and Written Opinion, dated Oct. 5, 2017, received in international patent application No. PCT/US2017/038539, 10 pgs.

*Primary Examiner* — Tai T Nguyen
(74) *Attorney, Agent, or Firm* — Verrill Dana, LLP; John W. Powell

(57) ABSTRACT

A device disposed on a subject to maintain the subject within a containment zone and track the subject if the subject exits the containment zone. The device includes a positioning unit for generating position data including satellite positioning data. There is a processor unit to determine from the position data if the subject is inside or outside of the containment zone. The processor unit operates in a containment mode when the subject is inside the containment zone and in a tracking mode when the subject exits the containment zone. A correction unit issues a stimulus when the subject exits the containment zone and terminates the stimulus when the processor unit enters the tracking mode from the containment mode. There is a communication unit which transmits an alert to an electronic device of an operator when the processor unit transitions from the containment to tracking mode.

18 Claims, 15 Drawing Sheets

(58) Field of Classification Search
USPC ...... 340/539.1, 539.13, 539.22, 573.1, 574.1
See application file for complete search history.

(56) References Cited

U.S. PATENT DOCUMENTS

| | | | |
|---|---|---|---|
| 6,903,682 B1* | 6/2005 | Maddox | A01K 15/023 |
| | | | 342/357.55 |
| 9,258,982 B1* | 2/2016 | Golden | A01K 11/008 |
| 2014/0261235 A1 | 9/2014 | Rich | |
| 2015/0040839 A1 | 2/2015 | Goetzl | |
| 2015/0097668 A1 | 4/2015 | Mueller | |
| 2015/0366166 A1* | 12/2015 | Mueller | H04W 4/02 |
| | | | 340/573.3 |
| 2016/0189496 A1* | 6/2016 | Modi | G08B 13/08 |
| | | | 340/545.2 |

* cited by examiner

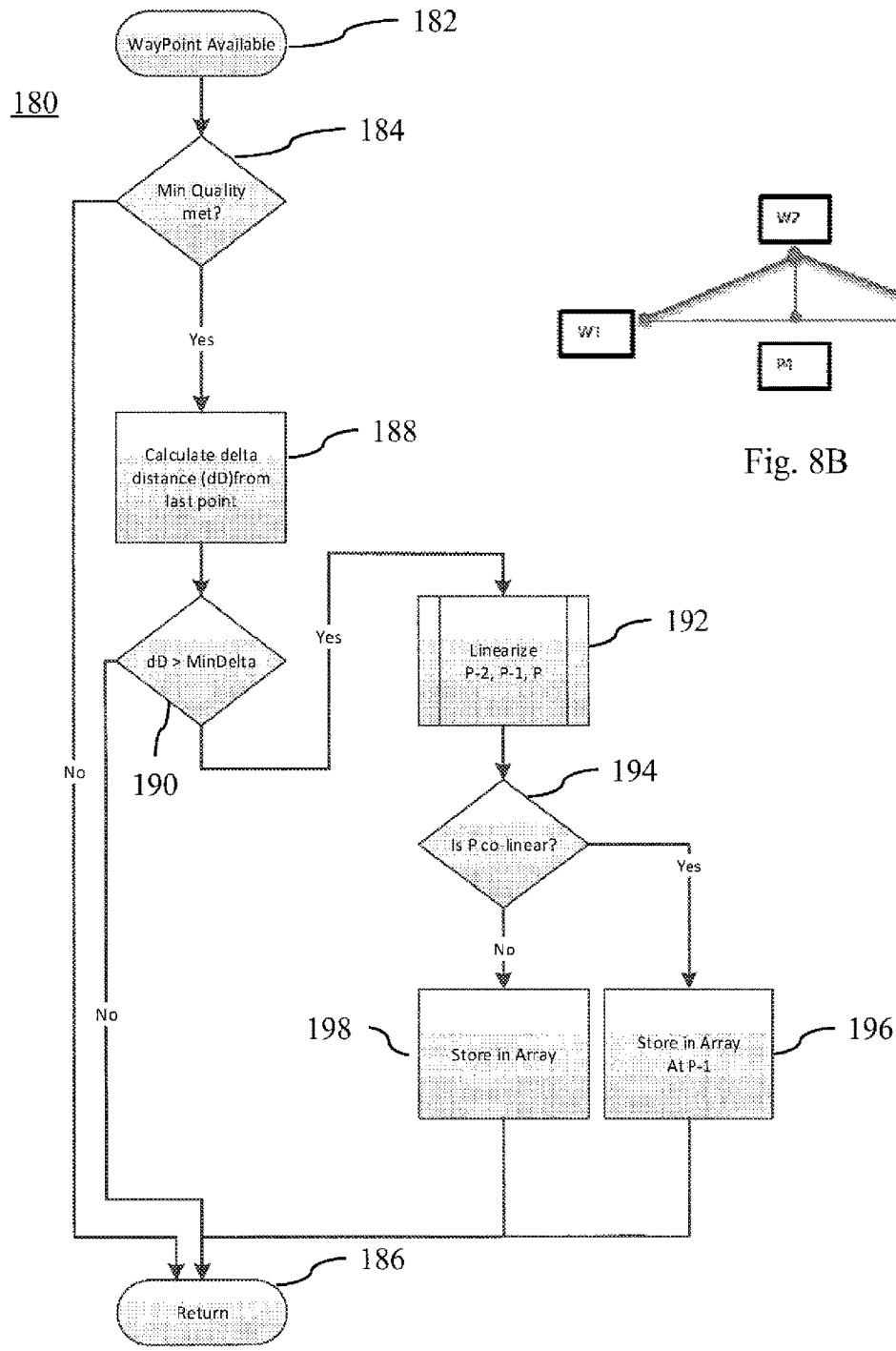
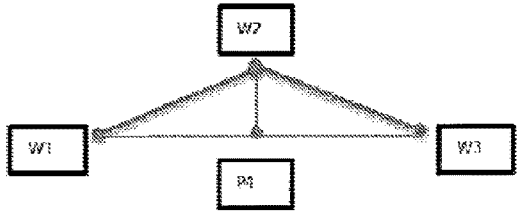
Fig. 8B
Fig. 8A

DEVICE AND METHOD FOR CONTAINING A SUBJECT USING SATELLITE POSITIONING DATA

CROSS-REFERENCE TO RELATED APPLICATION

This application is a continuation of and claims priority to U.S. patent application Ser. No. 15/190,301 filed Jun. 23, 2016, now granted as U.S. Pat. No. 9,654,925 on May 16, 2017, and entitled "DEVICE AND METHOD FOR CONTAINING AND TRACKING A SUBJECT USING SATELLITE POSITIONING DATA", which is herein incorporated by reference in its entirety.

FIELD OF INVENTION

This invention relates to containing and tracking a subject, e.g. an animal, a human, or an object such as a vehicle, using satellite positioning data and more specifically to such a system which uses additional data to augment the satellite positioning data to improve positioning accuracy.

BACKGROUND

Containment systems for animals/pets, in particular dogs, have been used for several decades. The most commonly used containment system is the buried wire fence system, which uses a stimulus collar worn by the pet and the containment area is defined by a buried wire. When the pet approaches the buried wire the collar picks up a radio signal. The radio signal is generated by a control box, which is located inside the pet owner's residence and sent through the buried wire. Typically, there is a warning zone close to the boundary and when the pet reaches this zone the collar emits an audible signal. If the pet continues to the boundary, the collar will issue a static correction, hopefully causing the pet to retreat to the containment area.

There are certain inherent deficiencies and limitations with buried wire fence systems. Since these systems require a control box located within the pet owner's home with an uninterrupted power source and a length of wire buried in the ground, installation is difficult and generally requires a professional, which is expensive and time consuming. Additionally, once the installation is complete, the system typically remains buried at the property in the original configuration since removal and/or modification would be very costly.

Another inherent issue is that the buried wires tend to break in geographic regions that have changing seasons, due to freezing and thawing. Broken wires result in failure of the system, potentially allowing the pet to escape. This is particularly problematic since buried wire systems are open loop systems, i.e. they provide no feedback to the pet owner if the pet escapes.

With the limitations of buried wire systems, other animal containment systems which operate wirelessly have been introduced and provide some incremental improvements. These systems solve the problems associated with burying wires in the ground, however they still have a major limitation; namely, they are also open loop systems and do not provide feedback to the owner in the event the pet escapes the containment area.

Wireless systems have other limitations based on how they operate. The general operating principle is that the base station emits a radio signal and the collar detects the signal strength. When a defined low signal level threshold is detected, the collar will emit an audible correction and when it crosses an even lower threshold, the collar will issue a static correction.

The base station projects the radio signal in all directions equally, thus the containment area is always circular in shape. The owner defines the circle size by adjusting a radius dial on the base station, up to a maximum radius. Of course, yards take on various shapes and sizes and with the system being limited to a circular containment area it provides limited flexibility. Additionally, the pet owner must be careful that the signal does not project onto unwanted or undesired areas, such as neighboring yards or, even worse, busy streets. For large yards, multiple base stations may be needed and they must be set up in a fashion that the radio signals overlap in order for the pet to have a common coverage area and thus a pathway to roam between containment areas.

A further limiting aspect of the wireless solution is that the collar receives the radio signal from the base station via Line of Sight (LoS). Because of this, the emitting circle may become irregular in shape based on landscape effects and any object between the base station and the collar. This known phenomenon limits the styles and types of suitable yards to generally flat and clear areas to maximize the full distance of the circle.

Also available on the market is a wireless pet containment system using Global Positioning System (GPS). This system does not require buried wire and does provide more flexibility and customization regarding the containment area. It does however still require a base station and professional installation. The method used in this system is called a Real Time Kinematic (RTK) system, which is comprised of a base and a rover (i.e. collar).

Common in GPS and other satellite systems are the inherent positioning errors that come with the technology. GPS/other satellite system receivers receive and lock onto multiple satellites to determine location on earth. Because the satellites are several thousands of kilometers away, the signals they emit are subject to interference when traveling through earth's atmosphere (ionospheric errors). When the signals reach earth's surface, even more error is introduced by the local environment. Trees, buildings, land, and other objects reflect GPS/other satellite system signals and cause them to propagate differently. This causes delays and polarization effects. Positioning errors of this type are called multipath errors and play a significant role in the overall GPS/other satellite system error budget.

With the RTK system, the base is stationary and can minimize the overall positioning error by using carrier phase tracking. Error corrections are then sent by the base station to the rover/collar to reduce positional error of the collar. Thus, the RTK system has a stationary reference point and collar reference point and can actively track the distance of the rover from the base station with a high degree of accuracy.

However, there are shortcomings with the RTK system. First, the system requires a professional technician not only to install it, but also to modify any collar or containment area settings thereafter. Additionally, the distance from the base station (and hence the size of the containment area) is limited by LoS and local environmental obstructions. Moreover, the base needs an unobstructed view of the sky as well as an uninterrupted power source to work properly. And, as with the other systems described above, the system is an open loop system and does not provide feedback to the owner in the event the pet escapes the containment area.

In addition to pet containment systems, there has been a rise in pet collar tracking and location devices. Some location devices use cellular technology, which is limited by coverage area and is not very accurate. A preferred technology for tracking the location of pets uses the Global Navigation Satellite System (GNSS). Although, GNSS is not a perfect solution as there are many sources of error that impact location accuracy. While some errors are externally induced by the atmosphere and the local environment, others are introduced by the quality and type of technology used to build the GNSS receiver system.

One of the most critical aspects is the placement and type of antenna used in the GNSS receiver system within the pet collar. Current location and tracking collars are poorly architected and designed using sub-par components and techniques to reduce GNSS errors. Another important aspect is the GNSS receiver's inability to filter out erroneous signals. Large and closely spaced buildings in cities form so called "urban canyons" which cause significant multipath errors that can be upwards of tens or even hundreds of meters. Current tracking collars do not account for such environments and can cause large inaccuracies that misguide pet owners to their pets. In frantic moments, pet owners need accurate technology and techniques to be able to find their pets as efficiently as possible.

SUMMARY

It is therefore an object of the invention to provide a system which not only is capable of containing a pet (or other subject) to a defined area but which is also capable of accurately tracking the location of the pet if it escapes the containment area.

It is a further object of the invention to provide a containment system which may be easily installed and moved or reconfigured to provide a different containment area.

In one aspect, the invention features a device to be disposed on a subject for use by an operator for maintaining the subject within a containment zone and tracking the subject if the subject exits the containment zone. There is a positioning unit for generating position data corresponding to the position of the subject; the position data including satellite positioning data. There is a processor unit, in communication with the positioning unit, configured to determine from the position data if the subject is inside the containment zone or if the subject has exited the containment zone. The processor unit operates in a containment mode when the subject is inside the containment zone and the processor unit operates in a tracking mode when the subject is outside of the containment zone. There is a correction unit, in communication with the processor unit, configured to issue the subject a stimulus when the processor is in the containment mode and the subject exits the containment zone and to terminate the issuance of the stimulus to the subject when processor unit enters the tracking mode. And, there is a communication unit, in communication with the processor unit, configured to transmit an alert to an electronic device of the operator by way of a communication network when the processor unit transitions from the containment mode to the tracking mode.

In other aspects of the invention one or more of the following features may be included. The positioning unit may include a global navigation satellite system receiver in communication with a plurality of satellite constellations to produce the satellite positioning data and the positioning unit may further include an attitude and heading reference system configured to provide to the processor unit attitude and reference data regarding the subject; wherein the position data includes the attitude and reference data. The attitude and heading reference system may comprise one or more of a gyroscope, accelerometer, and a magnetometer. While the processor unit remains in the tracking mode, the communications unit may be configured to transmit to the electronic device of the operator by way of the communication network the position data of the subject to allow the operator to track the location of the subject. The communication unit may include a cellular communications device configured to transmit the alert and the position data of the subject to the electronic device of the operator by way of a cellular communication network; and the communication unit may further include a Bluetooth low energy (BLE) module configured to communicate with the electronic device of the operator or a BLE fob when the user is in close proximity to the subject wearing the device.

In yet other aspects of the invention one or more of the following features may be included. The correction unit may include a static circuit for issuing the stimulus to the subject in the form of a static correction when the subject exits the containment zone, and wherein the correction unit may further include an audio speaker for issuing an audible correction when the subject is within a predetermined distance of a perimeter of the containment zone. When the subject is outside the containment zone, but for less than a predetermined time period, the processor unit may remain in the containment mode and when the subject is outside the containment zone for a time period longer than the predetermined time period, the processor unit may transition to the tracking mode. The processor unit may be configured to transition from the tracking mode to the containment mode if the subject returns to the containment zone after leaving the containment zone without causing the correction unit to issue a stimulus to the subject when the perimeter of the containment zone is crossed by the subject returning to the containment zone. The subject may be one of an animal, a human, or an object and the device may be in the form of a collar.

In another aspect, the invention features a method for an operator to maintain a subject within a containment zone and track the subject if the subject exits the containment zone by way of a device worn by the subject. The method includes generating position data corresponding to the position of the subject; the position data including satellite positioning data and determining from the position data if the subject is inside the containment zone or if the subject has exited the containment zone. The determining step includes operating in a containment mode when the subject is inside the containment zone and operating in a tracking mode when the subject is outside of the containment zone. The method includes issuing the subject a stimulus when operating in the containment mode and the subject exits the containment zone and terminating the issuance of the stimulus to the subject when operating in the tracking mode and transmitting an alert to an electronic device of the operator by way of a communication network when there is a transition from the containment mode to the tracking mode.

In further aspects of the invention one or more of the following features may be included. The step of generating position data may include using a global navigation satellite system receiver in communication with a plurality of satellite constellations to produce the satellite positioning data and wherein the step of generating position data may include using an attitude and heading reference system to provide attitude and reference data regarding the subject; wherein the position data includes the attitude and reference data.

The attitude and heading reference system may comprise one or more of a gyroscope, accelerometer, and a magnetometer. While in the tracking mode, the step of transmitting may include transmitting to the electronic device of the operator by way of the communication network the position data of the subject to allow the operator to track the location of the subject. The step of transmitting may include using unit a cellular communications device to transmit the alert and the position data of the subject to the electronic device of the operator by way of a cellular communication network; and wherein the step of transmitting may further include using a Bluetooth low energy (BLE) module to communicate with the electronic device of the operator or a BLE fob when the user is in close proximity to the subject wearing the device.

In yet further aspects of the invention one or more of the following features may be included. The step of issuing may include using a static circuit for issuing the stimulus to the subject in the form of a static correction when the subject exits the containment zone, and wherein the step of issuing may further include using an audio speaker for issuing an audible correction when the subject is within a predetermined distance of a perimeter of the containment zone. Wherein when the subject is outside the containment zone, but for less than a predetermined time period, the determining step may include operating in the containment mode and when the subject is outside the containment zone for a time period longer than the predetermined time period the determining step may include operating in the tracking mode. When transitioning from the tracking mode to the containment mode if the subject returns to the containment zone after leaving the containment zone, the method may include preventing the issuance of a stimulus to the subject when the perimeter of the containment zone is crossed by the subject returning to the containment zone. The subject may be one of an animal, a human, or an object and the device may be in the form of a collar.

These and other features of the invention will be apparent from the following detailed description and the accompanying figures, in which:

BRIEF DESCRIPTION OF THE FIGURES

FIG. 8A is flow diagram depicting the record way point step of the flow diagram of FIG. 7;

FIG. 8B is a block diagram depicting the linearization step of the flow diagram of FIG. 8A;

DETAILED DESCRIPTION

To assist understanding of the invention, a preferred embodiment will be described in detail below. The detailed description of the preferred embodiment of the invention will be directed to a pet containment and tracking system and method, but the invention is also capable of use with other types of subjects, including farm animals and even people. With respect to people, useful applications include containing and tracking children, the elderly, as well as individuals who are under house arrest or the like. Of course, with people, the system would not use the typical static correction used with pets/animals. The invention may also be extended to containing and tracking mobile objects, such as bicycles, automobiles, motorcycles and the like.

Figure 1:
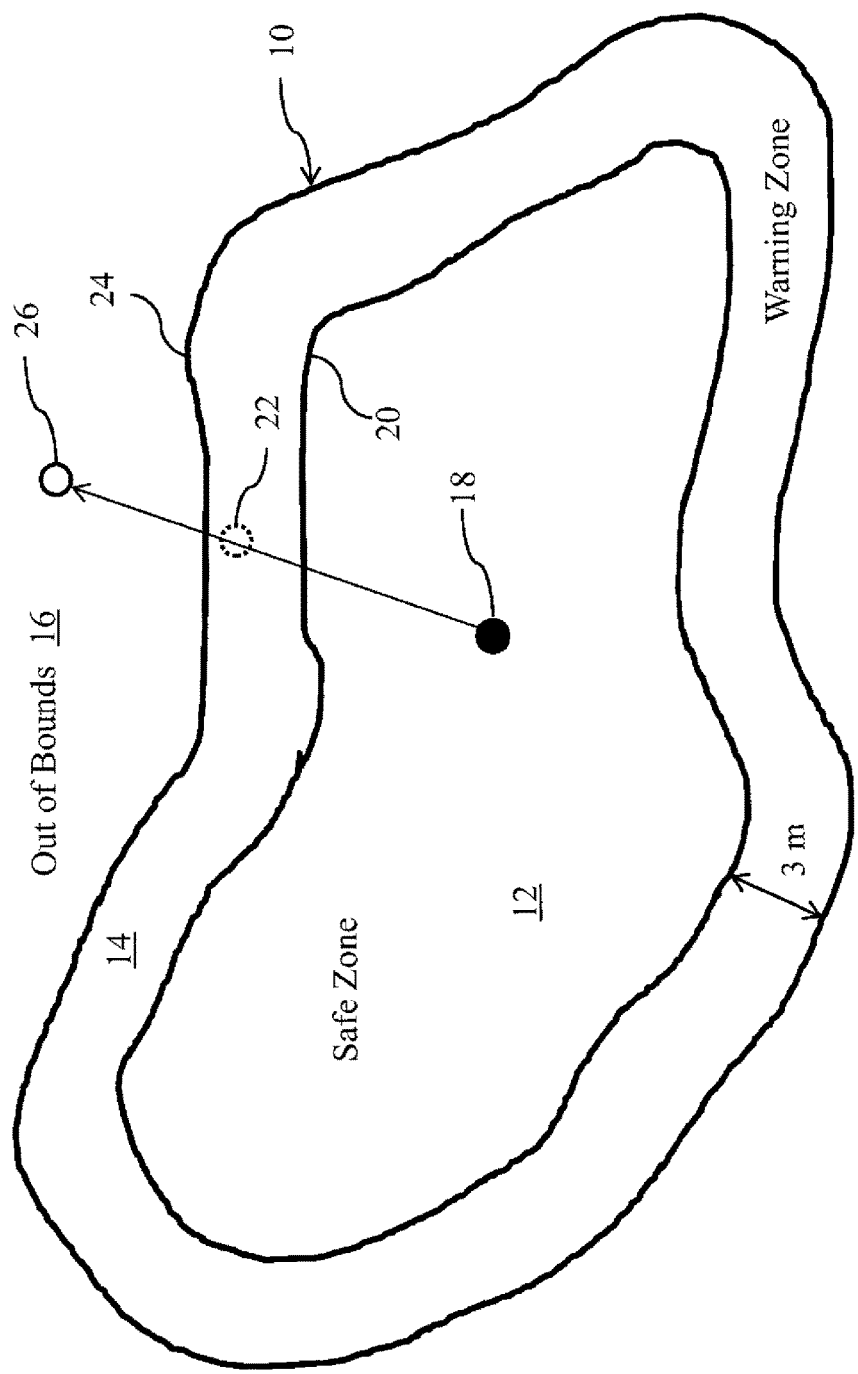
FIG. 1 is a map of a containment area established according to the invention.

Referring to FIG. 1, once a containment area 10 is established and activated, as described in detail below, the system will operate in a containment mode and utilize a subset of algorithms and augmented GNSS positioning information to track the pet and keep it within the containment area, which includes safe zone 12 and warning zone 14. Any area outside of containment area is considered to be in out of bounds zone 16.

Figure 2:
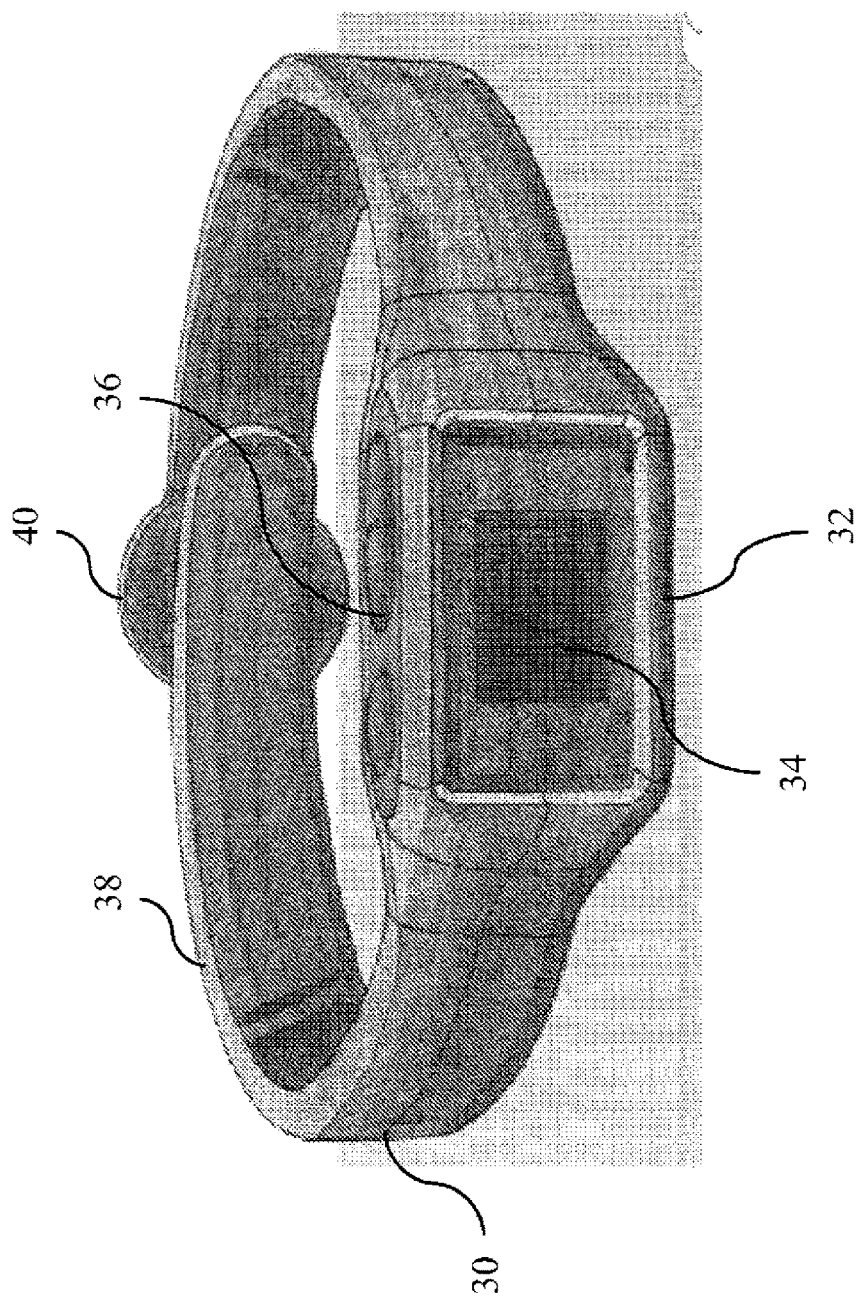
FIG. 2 is a perspective view of a stimulus collar according to the invention.

When the pet is in safe zone 12, as indicated at location 18, a collar, such as stimulus collar 30, FIG. 2, worn by the pet will operate with no audible or static corrections issued. However, as the pet moves toward and crosses the perimeter defining warning zone 14, to position 22, the collar 30 will issue an audible correction until the pet moves back into safe zone 12. The perimeter 20 of warning zone 14 may be established by offsetting it a predetermined distance (in this example it is 3 meters, but could be any suitable distance) from the containment perimeter 24 of containment area 10. If instead of retreating to safe zone 12 when hearing the audible warning, the pet continues through warning zone 14 and breaches containment perimeter 24, to position 26, for example, the system determines that the pet is in out of bounds zone 16 and issues a static correction.

Stimulus collar 30 will issue a static correction only for a predetermined maximum time while the pet is in out of bounds zone 16. Once this predetermined time has elapsed, the collar 30 will transition into a tracking mode and issue an alert to a cloud server and subsequently update the pet owner's smart device advising that the pet has escaped containment area 10. As long as the pet is in out of bounds zone 16, collar 30 will issue continual updates to the cloud server and subsequently update the pet owner's smart device with location information. From the cloud server or the pet owner's smart device, additional information, for example, the pet's name, pet's location, bread crumb trail of the pet, whether the pet is moving or not moving, distance from the containment area 10, distance from the smart device to the pet, time the pet left the containment area and the directions to the pet's then current location may be provided.

If the pet is in the out of bounds zone 16 and re-enters the containment area 10 the collar will not issue another static correction and the pet will be allowed to safely re-enter the containment area 10 and the collar will re-enter the containment mode of operation. Another alert will be sent to the pet owner's smart device stating that the pet has safely returned to containment area 10.

Shown in FIG. 2, is a particular design of stimulus collar 30 which includes a user interface 32 with a display 34, such as an LED or OLED display, and buttons 36 for the user to input information. Collar 30 includes a band 38 which may be secured by a clasp 40 comfortably around the neck of the pet. Clasp 40 may be any suitable type of clasp, including one which mechanically engages the ends of the band 38. The invention is not limited to use in the form of a collar for a pet. Any suitable means for securing a device for providing containment and tracking according to this invention may be affixed to animals, humans or mobile objects such as bicycles, automobiles, motorcycles and the like. Although not shown in this figure, a speaker for issuing audible corrections and probes for contacting the pet for issuing static corrections would be included on collar 30.

Figure 3:
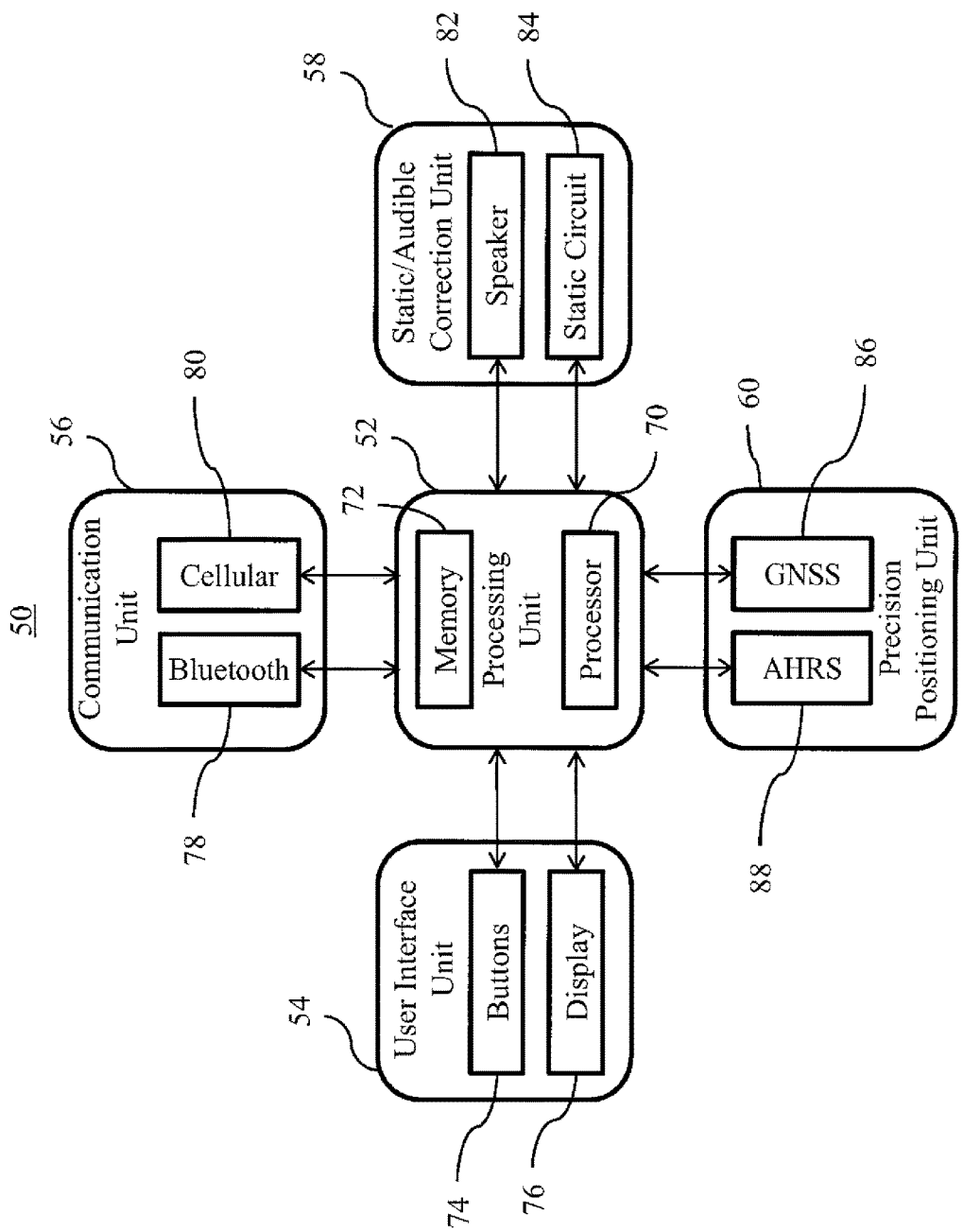
FIG. 3 is a schematic block diagram of the electronic components of the stimulus collar of FIG. 2.

The electronic components/peripherals of stimulus collar 30 are shown in schematic block diagram 50, FIG. 3. This includes processing unit 52 which is in communication with user interface unit 54, communication unit 56, static/audible correction unit 58 and precision positioning unit 60. Processing unit 52 includes microprocessor 70 to provide overall control for the electronics and functionality of the stimulus collar 30 and a memory 72, which stores software to execute the functionality of the collar 30 as well as store the maps of containment areas defined by the user.

User interface 54 includes buttons 74 for the user to input information and/or select options and functions presented on OLED display 76. The information is provided to the processing unit 52 to be acted upon and the processing unit provides display information to the OLED display 76 to be viewed by the user.

The communication unit 56 includes a cellular communications device 80, which may further comprise a 2G cellular-Global System for mobile Communication (GSM)/ General Packet Radio Service (GPRS) and 3G cellular-Universal Mobile Telecommunications System (UMTS)/ High Speed Packet Access (HSPA). The cellular communications device 80 is used to complete the closed loop system of this invention by providing critical alerts and information to the pet owner. When the pet has escaped the containment area the system switches to the tracking mode and provides information to the pet owner, such as pet location and other information, as described above. It can also provide other useful information such as battery status information or system error messages.

Communication unit 56 additionally includes a Bluetooth Low Energy (BLE) module 78 for communication with a fob (or, alternatively, the pet owner's smart device), which the operator may use during training of the pet to issue corrections. The fob/smart device transmits signals which are received by the BLE module 78 and the BLE Module 78 communicates with the static/audible correction unit 58 (through processor unit 52) to issue audible corrections via speaker unit 82 and static corrections via static circuit 84 for containment and behavioral reinforcements.

The precision positioning unit 60 is comprised of a global navigation satellite system receiver, such as a triple constellation concurrent GNSS receiver 86 and an Attitude and Heading Reference System (AHRS: 3-axis gyroscope, 3-axis accelerometer, and 3-axis magnetometer) 88. The GNSS receiver 86 is a triple band receiver that is capable of tracking three (3) constellations concurrently: GPS, GLONASS, and GALILEO. This provides the GNSS receiver 86 with the best opportunity to lock onto as many satellite vehicles as possible. This approach reduces certain GNSS errors as it pertains to number of satellites in view (satellite vehicles above a cutoff elevation angle), improved Geometric Dilution of Precision (GDOP), and specifically access to GALILEO, which offers improved Circular Error Probable (CEP) over GPS and GLONASS.

Figure 4:
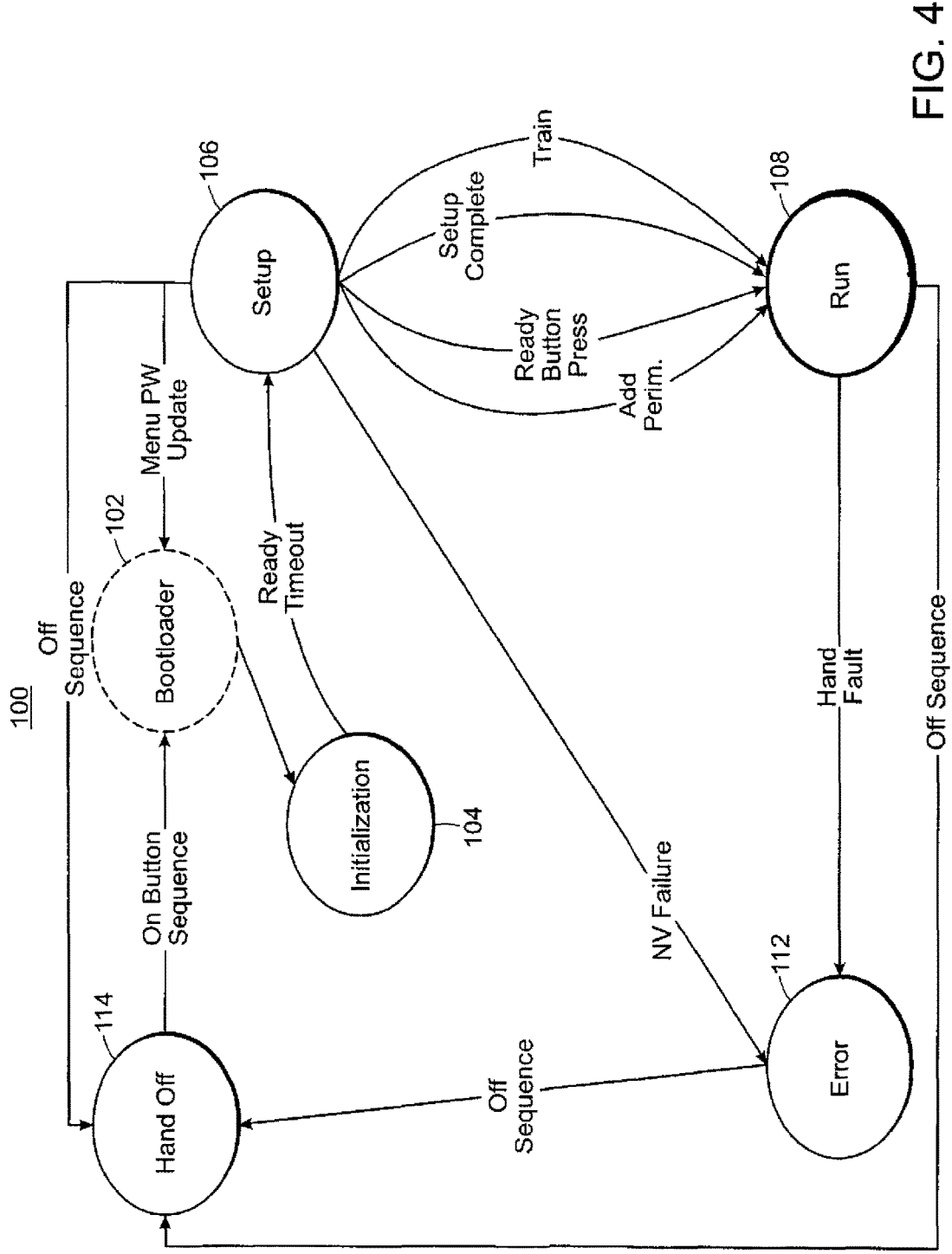
FIG. 4 is a state diagram depicting the top level software states for the stimulus collar.

The top level software states for the stimulus collar 30 are depicted in state diagram 100, FIG. 4. In state 102, when the power of collar 30 is turned on, software from memory 72, FIG. 3, is loaded in microprocessor 70. In state 104 an initialization process is instituted and a check of the various subsystems is carried out. The initialization state is the first state the software enters from any powered off state. In this state the software will set up hardware communication channels with the peripherals and configure each peripheral to a known state. The software will also read the configuration parameters out of non-volatile storage.

Upon completion of the initialization steps, the software will transition to the setup state 106. If setup has been previously completed the system proceeds to run state 108 and, with the collar on the pet, the system functions according to run state diagram 120, FIG. 5, in the containment/ tracking modes, as described below. If setup has not been completed, then the system proceeds to the main menu and the operator may select to proceed to the learn mode (perimeter setup) and/or training mode, both of which are depicted in FIG. 5.

From either the setup state 106 or the run state 108, in the event of failure, the system transitions to error state 112 and subsequently to hard off state 114. Also, from the set up state 106 or the run state 108 a hard off sequence may be initiated by the user.

Figure 5:
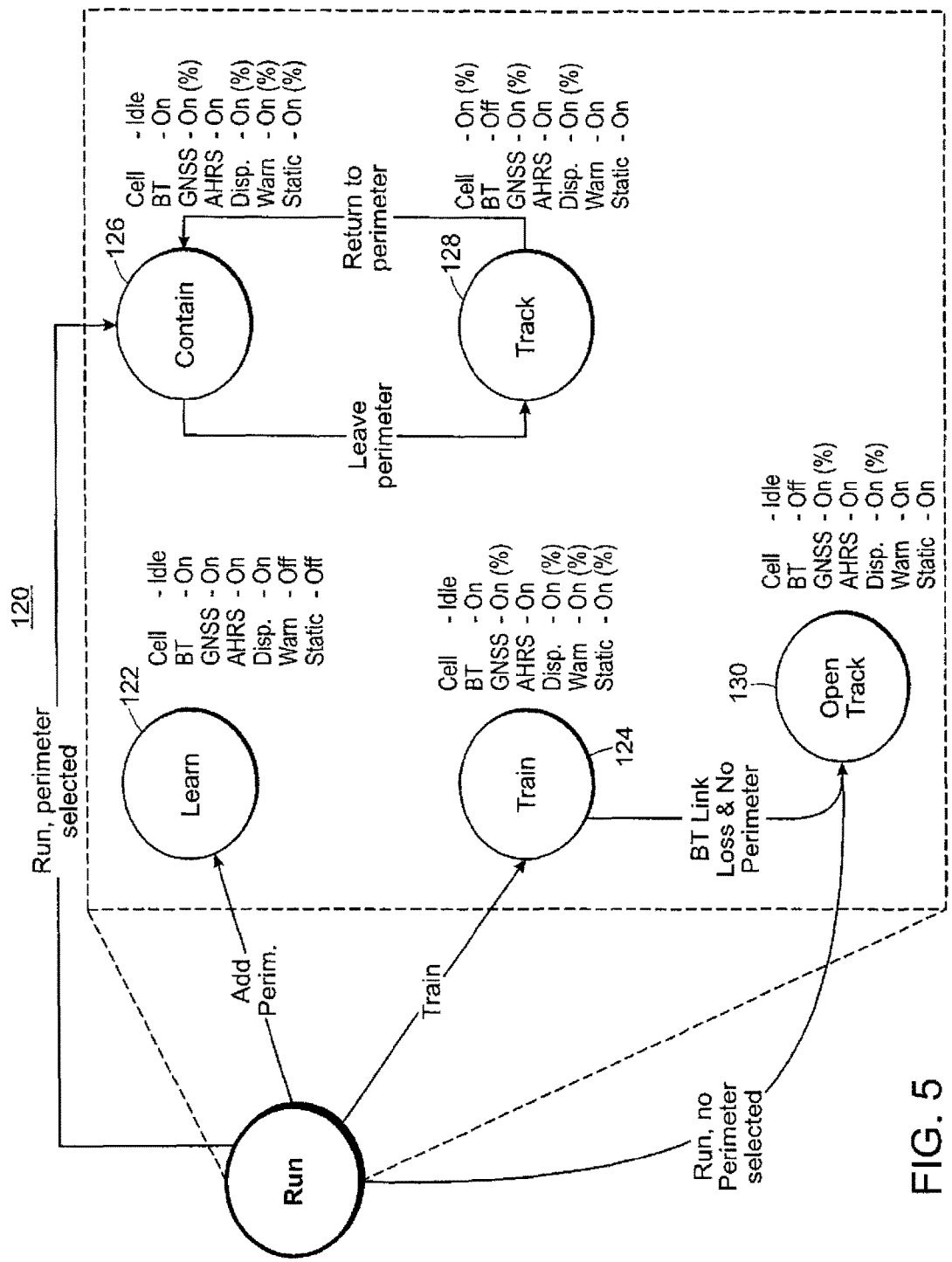
FIG. 5 is a state diagram depicting the software states for the run state of FIG. 4.

Referring to FIG. 5, run state diagram 120 includes learn sub-state 122. When learn sub-state is activated a new perimeter is learned and stored in memory 72 of processing unit 52, FIG. 3. The software enters the learn sub-state when the operator elects to define a new containment zone/ perimeter. While in this state the software turns on the display 76, AHRS 88, and GNSS receiver 86, but leaves the cell modem 80 and Bluetooth radio 78 in a low power state. The software collects waypoint data from the GNSS receiver to form a perimeter, and at the conclusion of the process checks the collected data for validity. If the points collected form a valid perimeter, the data is stored in non-volatile memory.

Run state diagram 120 also includes a train sub-state 124 which is entered when a user trains the pet. This is done using a fob or smart phone to manually issue static and/or audible corrections so that the pet can learn the consequences of leaving the defined containment zone. While in this state the cell modem 80 and display 76 are put into a low power state, while the Bluetooth radio 78 is enabled to allow communication between the fob or smart phone and collar 30. While in the train state the software will enable the audible warning and correction circuit, if instructed to via communication with the fob or smart phone. If the Bluetooth link to the fob or smart phone is broken, the system will transition into an open track state, as described below.

When the pet is trained and a containment area has been saved and selected the system proceeds to the contain state 126, in which case the collar 30 functions as described above to issue audible and static corrections if the pet enters the warning zone 14 or out of bounds zone 16, respectively, of FIG. 1. If the pet remains in the out of bounds zone for a predetermined time (notwithstanding the issuance of a static correction), the system transitions to the tracking state 128. When in tracking state 128 the Bluetooth radio 78 is powered down (if it was on), the cell modem 80 and display 76 are enabled. The software continues to monitor the animal's location in order to determine if it has returned to the containment area. The software will alert the pet owner through the cloud server that the animal has escaped the containment area and will periodically send location and other information (e.g. distance from the containment zone 10 and the directions to the pet's then current location) via the cell modem 80 through the cloud server and subsequently to the operator's smart phone.

If no perimeter has been selected and the user initiates tracking mode the system will transition to the open track state 130, which does not perform a containment function but rather performs the tracking function alone. The open track sub-state 130 maybe entered when the collar is in train sub-state 124 and the Bluetooth link is broken and no perimeter has been selected. When the system enters track sub-state 130 the Bluetooth radio 80 is powered down, and the cell modem 80 and display 76 are enabled, as well as the AHRS 88. The software continues to monitor the animal's location via GNSS, and will continue to report the animal's location through cellular link to the user's smart phone.

Figure 6:
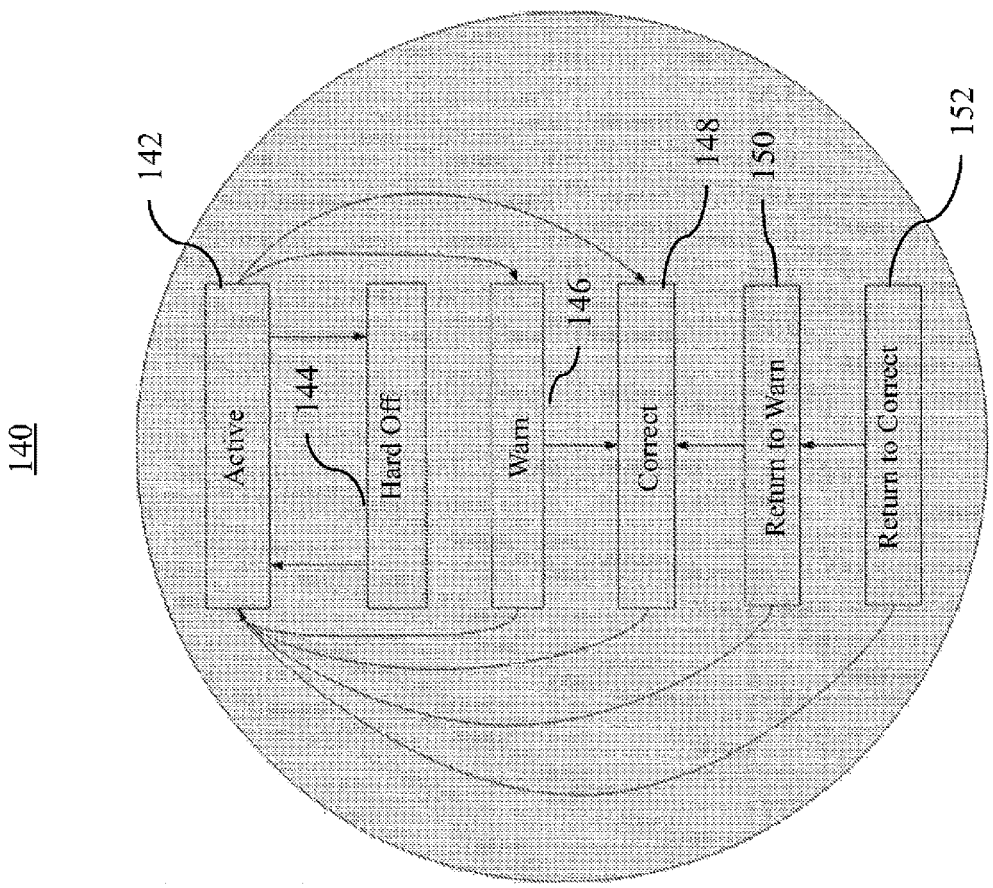
FIG. 6 is state diagram depicting the software sub-states for the containment state

The operation of contain sub-state 126, FIG. 5, is shown in more detail in FIG. 6 to include a number of lower sub-states as depicted in contain sub-state diagram 140. The contain sub-state may be activated at active state 142 or toggled into off state 144 according to state diagram 100 of FIG. 4. When in the active state 142, the system will move to the warn state 146 and issue an audible correction when the pet enters warning zone 14, FIG. 1, and either return to active state 142 if the pet retreats to the safe zone 12 or proceed to correct state 148 and issue a static correction if the pet proceeds to out of bounds zone 16. If in response to the static correction the pet retreats to the safe zone 12 then the system returns to active state 142. If the pet does not return to safe zone 12 after the static correction, then track state 128, FIG. 5 is entered. If the pet subsequently returns to the containment area, which is indicated at return to warn state 150 or return to correct state 152, the system reverts to active containment state 142.

The system enters warn sub-state 146 when the position data indicates the collar 30 has left the safe zone 12 and is in the warning zone 14. The software will activate the audible alarm and continue to monitor the location. If the reported position returns to within the safe zone 12 the software turns off the audible alarm and returns to active sub-state 142. If the reported position moves out of the warning zone 14 and into the out of bounds zone 16, the software transitions into the correct sub-state 148.

The software enters the correct sub-state 148 when the position data indicates the collar is in out of bounds zone 16. The software will activate the correction circuit (predetermined timeout) and continue to monitor the location. If the reported position returns to the warning zone 14 the software disables the correction circuit and transitions into warn sub-state 146. If the reported position returns to the safe zone 12 the software disables the correction circuit and transitions into the active sub-state 142. In the event the animal remains in out of bounds zone 16, the software disables the correction circuit and transitions out of contain state and into the track state.

The return to warn sub-state 150/return to correct sub-state 152 exist to handle the case where the animal has left the containment perimeter and was tracked, but has now returned to the warning zone. In this instance the static and audible corrections are not enabled, and the software continues to monitor the collar location. If the GNSS position indicates the animal is within the safe zone, the software transitions to the active sub-state 142. If the position indicates the animal has left the warning zone and entered the correction zone, the software transitions into the Correct sub-state.

Additional detail will now be provided about configuring the containment zone as well as position tracking of the pet in the containment zone and outside of the containment zone.

Containment Zone Configuration

The system provides a method for the pet owner to create a highly custom and accurate containment area comprised of GNSS waypoints stored in onboard memory. The owner simply initiates a Learn mode on the collar 30, walks the desired perimeter and saves a custom map into memory. There can be several different maps stored on collar 30 which may be selected by the user. The collar will determine if the user generated a valid containment perimeter and give a visual indication on display 34. Once a map is activated, the collar 30 can be placed on the pet and the self-contained containment system will run autonomously.

When collar 30 is powered on, the system will determine whether it has valid ephemeris and almanac data. If the system does not have valid ephemeris and almanac data, it will download new data. The system is capable of receiving updated ephemeris and almanac data through the cellular module 80. This is known as Assisted Global Navigation Satellite System (aGNSS) where the ephemeris and almanac data are transferred through cellular networks at much higher speeds. Once the system acquires the new and valid data, it will then begin obtaining satellite vehicles through the tri-band GNSS antenna. Once the GNSS subsystem has determined it has sufficient satellites in view, it will inform the user through the display 34 that it is ready to collect waypoints and begin creating a containment perimeter.

Figure 7:
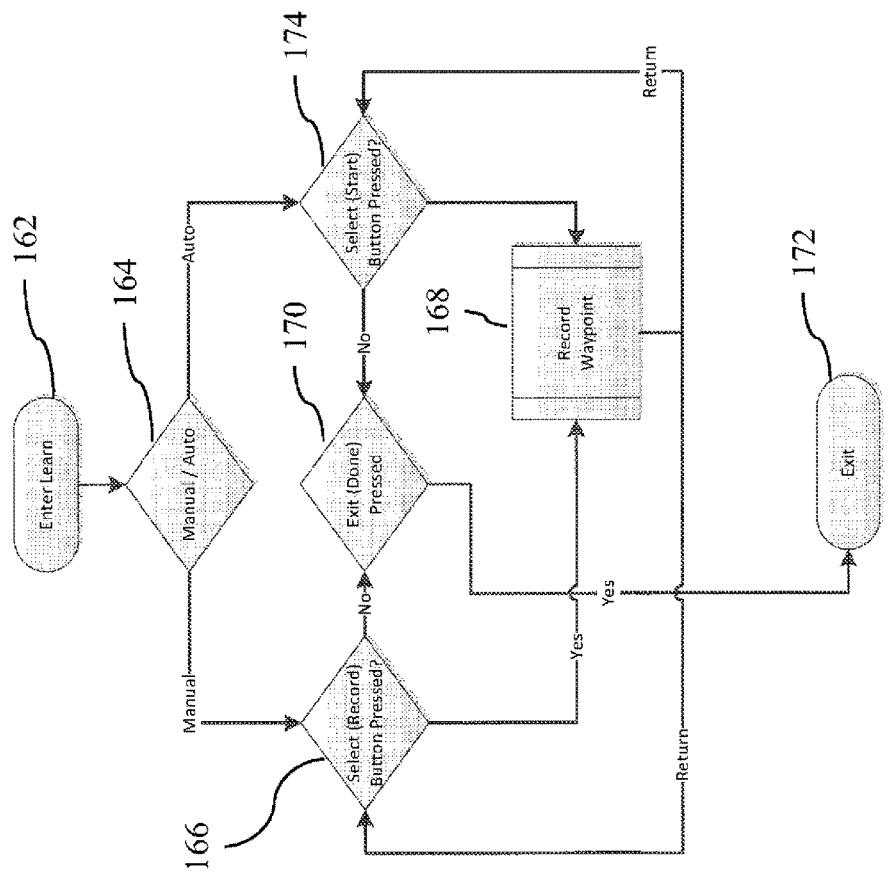
FIG. 7 is flow diagram depicting the learn mode of FIG. 5.

Flow diagram 160, FIG. 7, depicts the process for learn state 122 of FIG. 5 to establish a customized containment perimeter, such as perimeter 24 of FIG. 1. At step 162 the system enters the learn state when the user has selected this state by inputting a selection with buttons 36, FIG. 2. The user then selects at step 164 whether to manually record the waypoints as the collar 30 is walked along the perimeter or to have the system automatically record waypoints as the collar 30 is walked along the perimeter. If manual waypoint entry is selected at step 164, then the user will press the indicated button 36 at step 166 and at step 168 a way point will be recorded. The waypoint is in the form of longitudinal and latitudinal coordinates which are received from GNSS module 86 of precision positioning unit 60 of FIG. 3. Record waypoint step 168 is more fully described below with regard to FIG. 8. Once the waypoint is recorded, the user may continue to enter waypoints at steps 166 and 168 until the user has completed walking the perimeter and entering way points. By indicating at step 166 that no further waypoints will be entered, the system proceeds to step 170 where the user is asked if she would like to exit learn state/mode at which point the system exits the learn state/mode at step 172.

If, alternatively, auto waypoint is selected at step 164, then the user will press the indicated button 36 at step 174 and way points will automatically recorded (e.g. once every second) at step 168 as the user walks the perimeter. At step 174 the user can select the appropriate button to indicate the perimeter walk has been completed and then the system proceeds to step 170 where the user is asked if she would like to exit learn state/mode at which point the system exits the learn state/mode at step 172. It should be noted that while using the auto waypoint function, if the user encounters an obstacle a pause button may be pressed while the user walks around the obstacle and then the pause can be removed and the waypoint recording will continue. The last waypoint before pause was selected and after recording is resumed will be connected with a straight line through the obstacle. Flow chart 180, FIG. 8A, depicts the record waypoint process in more detail. At step 182 a waypoint, P, is made available either through manual selection or automatic selection as described in flow chart 160, FIG. 7. At step 184, the current waypoint is evaluated to determine if it is a sufficiently accurate waypoint. To determine if a minimum level of accuracy is present, the HDOP (horizontal dilution of precision) and/or PDOP (precision and positional dilution of precision) values, which are received from GNSS module 86, may be evaluated, for example. If the minimum values are not met, the system proceeds to step 186 where operation is returned to flow chart 160 for the selection of the next waypoint. If the minimum values are met at step 184, the system proceeds to step 188 where the distance (dD) from the previous waypoint to the current waypoint is calculated. If at step 190, the distance dD is less than a minimum value (MinDelta), the system proceeds to step 186 where operation is returned to flow chart 160 for the selection of the next waypoint. If the distance dD is greater than a minimum value (MinDelta), at step 192 the waypoint is linearized. The minimum value is set to ensure that the distance between waypoints is sufficient to form a discernible line segment given the system resolution. At step 194, it is determined if the waypoint is co-linear, then at step 196 the waypoint is stored in waypoint array at point P−1 as a waypoint for the containment perimeter being established. If it is determined that the waypoint is not co-linear then at step 198 the waypoint P is stored in another array.

The system then proceeds to step 186 where operation is returned to flow chart 160 for the selection of the next waypoint.

For each waypoint recorded where the point count is greater than 2, a test will be employed to determine if the variance from a straight line for the new waypoint is sufficiently small to warrant the replacement of the n−1 point with the then new point, effectively straightening the line.

The same calculation will be used for determining the distance of a containment point to containment perimeter. To calculate a distance from a point to a line where P3,P4 is perpendicular to P1,P2:

p1=x1,y1
p2=x2,y2
p3=x3,y3
p4=x4,y4

$$mu=((x3-x1)(x2-x1)+(y3-y1)(y2-y1)/(\|p2-p1\|))^2$$

mu between 0 and 1 indicates intersection
distance then is x3,y3 to x4,y4 (on the line segment)

$$x4=x1+mu(x2-x1)$$

$$y4=y1+mu(y2-y1)$$

$$distance=\sqrt{(x4-x3)^2+(y4-y3)^2}$$

As depicted in FIG. 8B, consider this situation where W1 and W2 have already been recorded in the array as the prior two waypoints, W3 is the new waypoint, and P4 will be calculated to determine the distance W2 to P4. The above algorithm can then be used, substituting:

$$P1=W1, P2=W3, P3=W2$$

$$mu=((W2x-W1x)(W3x-W1x)+(W2y-W1y)(W3y-W1y))/((\|W3-W1\|))^{\wedge}2)$$

$$P4x=W1x+mu(W3x-W1x)$$

$$P4y=W1y+mu(W3y-W1y)$$

And, solving for the distance:

$$=sqrt((P4x-W2x)^{\wedge}2\_(P4y-W2y)^{\wedge}2)$$

If the distance is less than a predefined epsilon, then W1, W2, W3 can be considered collinear and the W3 waypoint substituted for W2.

As described, the co-linear points stored in array P−1, may be reduced to reduce the number of line segments produced in the overall containment perimeter. Since the MinDelta distance criterion is already met, we deem that if a point is co-linear we can replace the previous co-linear point with the new one in order to reduce the number of line segments from two to one taken out to n points. This helps to reduce the number of points taken for memory optimization.

The waypoints saved which are not co-linear are still valid waypoints. For example, the user, when developing the perimeter, could have made an intentional move to avoid an object or make a turn and thus the point is not co-linear. When this is the case, we must keep it as part of the perimeter. This array is for points taken that are not co-linear and a bucket of points that signify a change in direction. When all way points have been collected and processed, the co-linear way points are merged with the way points which are not co-linear to form the full containment perimeter.

Figure 9:
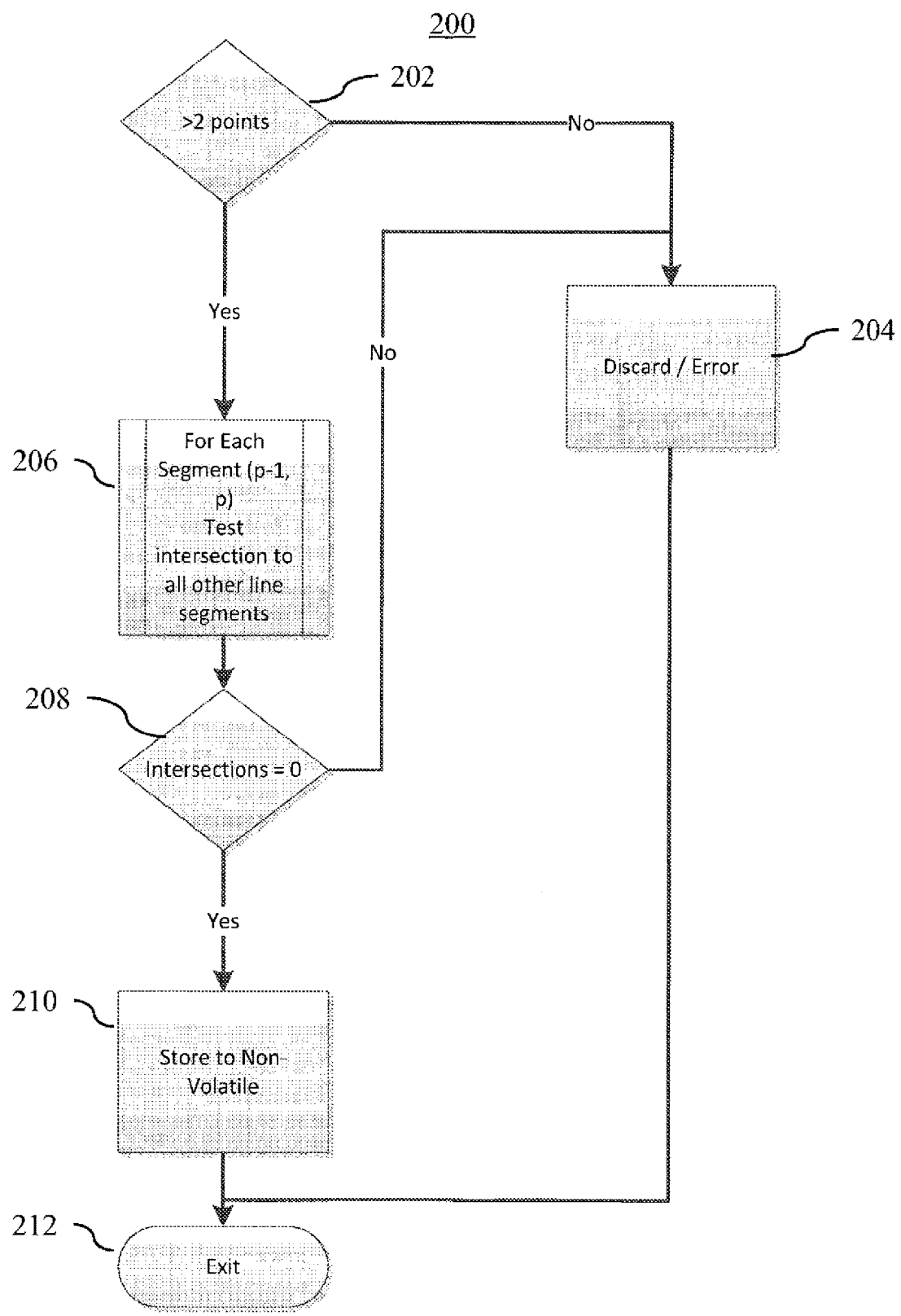
FIG. 9 is flow diagram depicting method of assessing the validity of a containment perimeter.

Referring now to flow chart 200, FIG. 9, exit step 172 of flow chart 160, FIG. 7 is described in more detail. The process described by flow chart 200 determines whether the set of waypoints collected to form a desired containment perimeter is a good/closed or properly formed perimeter, i.e. a perimeter which is in the shape of a polygon. The containment area can be as large and have as many sides as desired as long as the polygon does not intersect itself At step 202, it is determined if the total number of waypoints collected and in the waypoint array exceeds two. If it does not then the waypoint array is discarded and an error message is provided to the user at step 204. If total number of waypoints collected exceeds two, at step 206, each segment formed by the waypoints (P−1, P) is tested against all other segments to see if there are any segment intersections. If at step 208, it is determined that there is at least one segment intersection the waypoint array is discarded and an error message is provided to the user at step 204. If there are zero segment intersections, then at step 210 the array of waypoints is stored in nonvolatile memory 72 of processing unit 52, FIG. 3, as a containment map for use by the user and the system exits at step 212 and returns to the main menu and waits for the user to select a function.

Way Point Error Reduction

Traditionally with GNSS receivers, there are inherent positional errors due to atmospheric influences, satellite geometries and DOPs, and local multipath environment. Since satellites orbit the earth 2 times in a span that is slightly less than twenty four (24) hours, for any given point on earth, or latitude and longitude, the error will change over that time having a maximum error value and minimum error value. The satellites will rise and set about 4 minutes earlier each day. As such at any given point on earth's surface, it will repeat the same error two times in one day.

This becomes an issue when the user is going to define a containment perimeter because it will be the expected perimeter used from that point on at their primary residence or any other location they may take it. Thus, the waypoints recorded when the user establishes a containment perimeter may have errors that could result in the formation of an unintended perimeter of the containment area if the time the waypoints are recorded coincides with the time varying errors inherent in the GPS or other satellite systems described above. The user cannot be limited to generating a containment perimeter at only specific times during the day, a method to reduce inherent and arbitrary GNSS errors at any given time must be provided.

Figure 10:
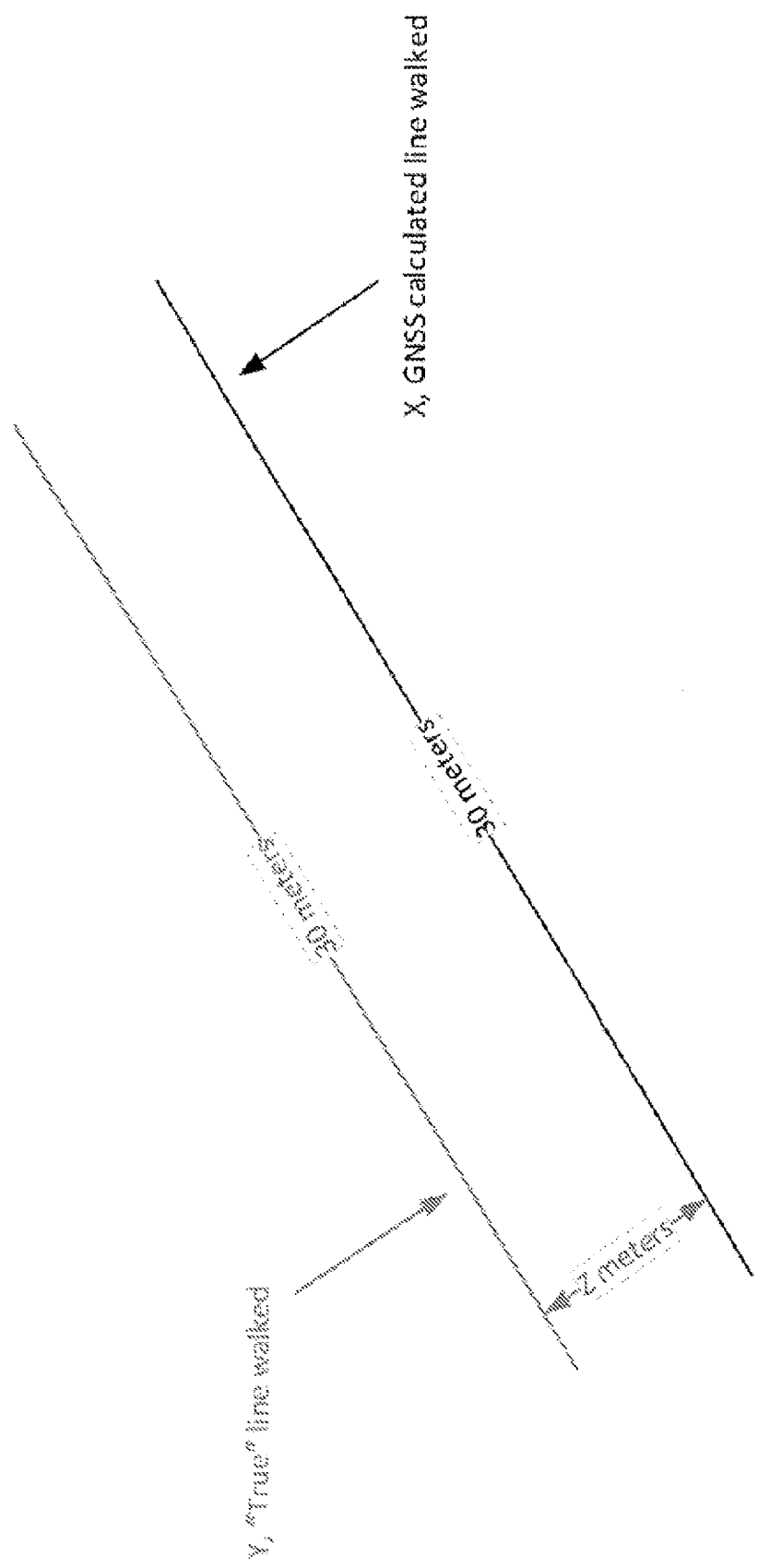
FIG. 10 is a diagram depicting the impact of possible GNSS system errors in establishing a containment perimeter.

A preferred method for reducing waypoint errors is called the "saw tooth" method. For any given point or straight line, there will be an associated error or distance offset from that point or straight line. Typically when setting a containment perimeter the user will walk in straight lines or curves. The calculated GNSS position could be Z meters (e.g., up to several meters) away from the "true" position at any given time due to the above-described positional errors. To illustrate this, referring to FIG. 10, if the user walks a straight line, line Y, for 30 meters at a point in time, the calculated GNSS straight line, line X, could have a constant offset or constant positional error delta of Z meters during the entire walk of 30 meters.

This, of course, could cause a significant problem. For example, a pet owner may want to use a visible part of the yard (e.g. where the grass meets the edge of the driveway or road) as a part of the containment perimeter. If where the grass meets the driveway/road is the visible "true" indicator of where the pet owner walked in establishing the containment perimeter, then the calculated GNSS position could have an error, Z meters. This could place the perimeter of the containment area in the middle of the driveway or worse yet the road.

The above described error can be compounded over time. As satellites orbit the earth, they are moving the GNSS error line which can cause the noted error, Z, to be larger and smaller causing a high variability over the course of time. These conditions can occur during turns onto different portions of the intended containment perimeter. For example, if the user intends to walk a square for their containment perimeter, they will start walking in a straight line and the GNSS system accurately places them on that intended line. However, with DOPs (dilution of precision) and local multipath influences, when the user turns right or left onto the next leg of the perimeter, the GNSS system may overshoot or undershoot the intended turn. This over-shoot or undershoot then becomes the Z-meter offset. Since the user will tend to continue to walk in a straight line, the GNSS system will never correct the error offset because it is predicting the next location based on previous location, Speed over Ground (SoG) and Course over Ground (CoG), values.

With GNSS systems, there are several bits of data that come out of the National Marine Electronics Association (NMEA) message string. Two important pieces of data are the Course over Ground (CoG) and Speed over Ground (SoG) values. Known GNSS systems can accurately predict the location of a moving object by knowing the previous CoG value, heading relative to North, and SoG value, speed in meters/second.

Figure 11:
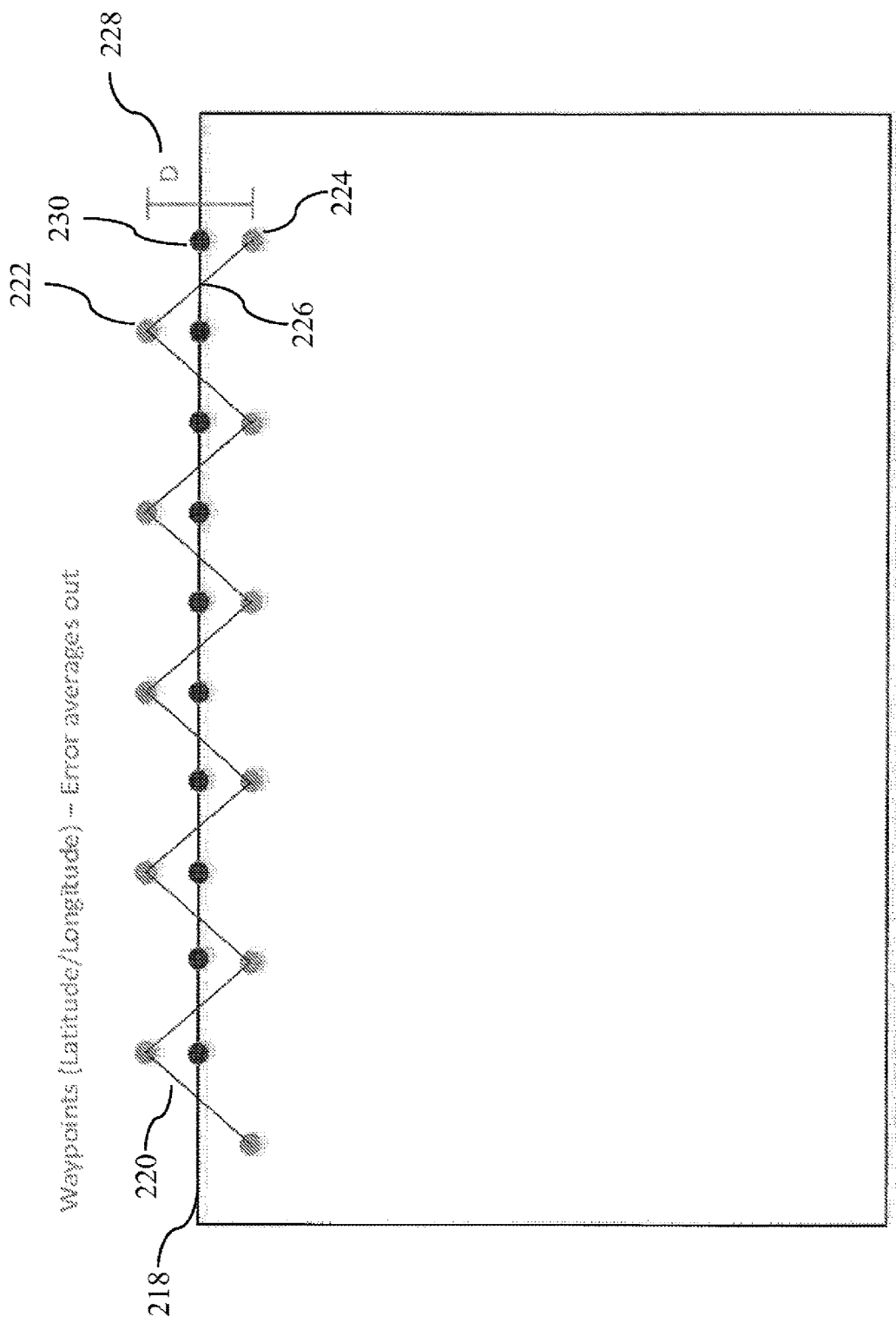
FIG. 11 is a diagram depicting the saw tooth correction method for reducing the impact of possible GNSS system errors shown in FIG. 10.

To compensate for this error, the user may make an action to force the GNSS system to change CoG. By changing direction the GNSS must then account for changes in CoG. In order to correct for this offset error over time and reduce the overall variability, the GNSS receiver must cross the intended "true" perimeter 218 several times to average out the error. This may be accomplished by having the user walk across the intended containment perimeter in a saw tooth pattern (i.e. each segment crosses the intended perimeter 218 at an angle), such as pattern 220 shown in FIG. 11, in order to average out the error.

The saw tooth approach can be incorporated into the logic described above for waypoint recording by taking the actual waypoints collected for the end points (e.g. 222 and 224) of each saw tooth segment (e.g. 226) and taking the average distance between the two end points of each saw tooth segment. These end points are waypoints taken in latitude and longitude to determine the halfway point. Once the user completes the walk (or completes the containment perimeter) the perimeter can then be 'drawn" using the averages of the end points (e.g. average point 230). The two end points of each section are recognized by detecting a change in direction which is determined from the waypoints. Once the change in direction occurs, the latitude and longitude values are saved in temporary memory and used to calculate the halfway point between the two as follows:

WayPoint1=WP1=(latitude, longitude)
WayPoint2=WP2=(latitude, longitude)
New WayPoint=NWP=(latitude, longitude)
Let WP1=42.928521, −71.532675
Let WP2=42.928534, −71.532730
Therefore, $$NWP=(WP1+WP2)/2=((42.928521+ \\ 42.928534),(-71.532675+-71.532730))/2= \\ ((85.857055),(143.065405))/2 \; NWP= \\ (42.928527,-71.532702)$$

The full equation with n number of samples within the containment perimeter then becomes:

$$(WP1+WP2)/2=NWP1,(WP2+WP3)/2=NWP2,(WP3+ \\ WP4)/2=NWP3, \text{ for } n \text{ samples}$$

This method can be verified using standard map tools to show that the new or average way point does indeed bisect the two way points taken at the end points of the saw tooth segment. Therefore, when the user finishes walking the perimeter, a containment map will have been developed with error compensation. This approach reduces the overall error at any given time, thus producing a map that is more accurate than one that is comprised of just real-time way points from the GNSS output.

Position Tracking

Once a containment perimeter has been established and selected to contain a pet, the containment state/mode may be activated by the user. In this mode, the system must be able to quickly and accurately determine if the pet is in the safe zone 12, warning zone 14, or out of bounds zone 16 of FIG. 1. The GNSS module 86 tracks three constellations and operates at a 3 Hz Output Data Rate (ODR). This ODR is sufficiently fast, but to be a very effective GNSS containment system, there needs to be a predictive element to ensure the pet stays within the safe zone. The preferred embodiment of the invention uses a ray casting technique to determine the location of the pet with respect to the containment area at any given time.

Figure 12A:
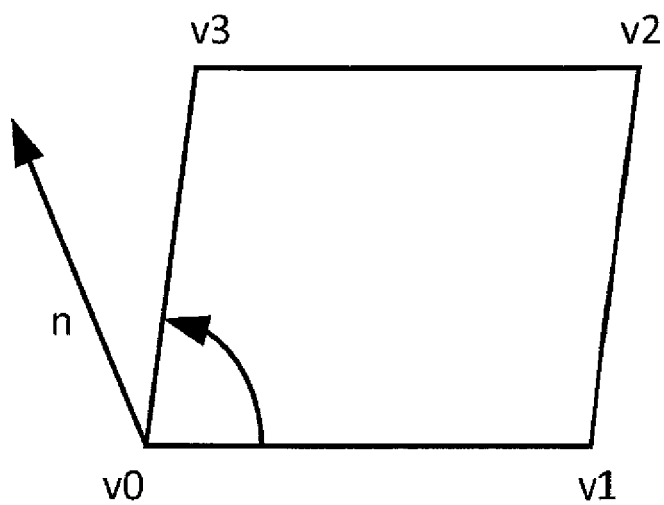
FIG. 12A is a diagrammatic representation of a containment zone in the shape of a polygon.
Figure 12B:
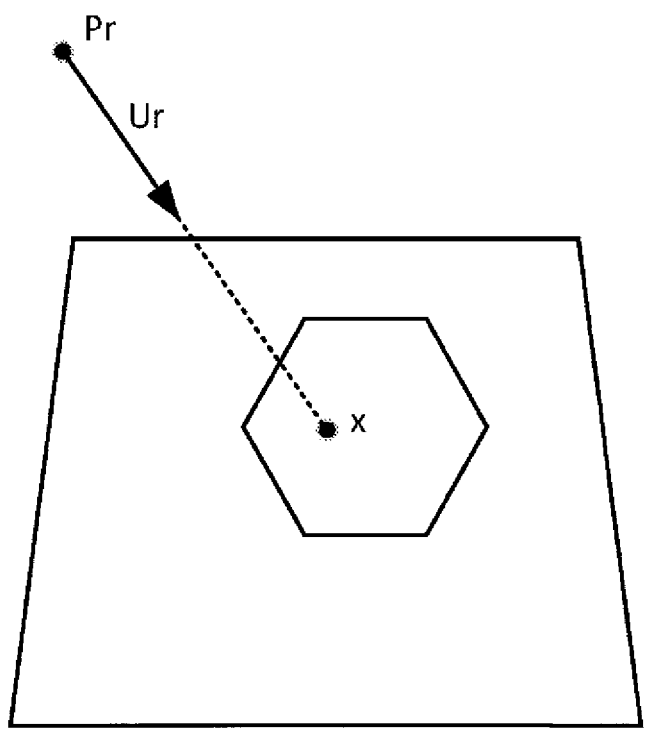
FIG. 12B is a diagrammatic representation of a containment zone in the shape of a polygon depicting a ray intersecting the plane of the polygon.

To describe this approach, referring to FIGS. 12A and 12B, we start with determining the plane in which the containment zone polygon lies by using two non-parallel edges to compute the normal to the plane:

$$n=(v1-v0)X(v3-v0)/\|(v1-v0)X(v3-v0)\|$$

and a vertex applied to complete the plane definition, $$p=v0$$

Therefore, the distance of any point x from the plane of the polygon is:

$$d=(x-p)*n$$

and the plane equation then becomes, $$(x-p)*n=0$$

Based on this geometric model, the plane in which the polygon lies has been determined. Each line segment can be constructed and converted to Local Tangent Plane (LTP) of the Earth Centered Earth Fixed (ECEF) coordinate system. Using this method, the output from the GNSS receiver system, latitude and longitude, can be used to figure a position Pr (see FIG. 12B), cast a ray to the nearest line segment, and predict the direction of a potential breach of the containment perimeter.

Using these principles, it can be determined quickly and accurately if the pet has breached the containment area and, if so, a notification alert can be immediately sent to the smart device of the owner and the system can transition to tracking mode to monitor the position of the pet. More specifically, the system casts a ray that intersects with the polygon (containment area) in two simple steps:

First the ray-plane intersection x is determined and then simply it is determined whether x is inside or outside the polygon. For this the general ray equation is used:

$$x=Pr+t(Ur)$$

t, the number of times the ray crosses the polygon, is determined.

Therefore, for the ray-plane intersection we can replace x with the plane equation from above:

$$t=((P-Pr)*n)/(Ur*n)$$

If t<0 then there is no intersection of the polygon. If t>0, then there is an intersection at:

$$x=Pr+t(Ur)$$

From this the number of times the ray crosses the polygon is determined. With this information we can then determine whether x (the pet) is inside or outside of the polygon. Note that the polygon vertices and point both lie on the same plane and therefore makes them planar. As such, if we cast a ray to the closest edge of the simple polygon, we can determine if the point is inside or outside the polygon by determining the number of times the ray crosses the polygon. If the number of crosses is odd (1, 3, 5, etc.), the point (pet) lies within the polygon. If the number is even (0, 2, 4, etc.), the point (pet) lies outside of the polygon.

When the pet is in the safe zone, there is a "Distance to Edge" calculation that is performed to determine if the pet is in the warning zone. If the Distance to Edge number is less than 3 meters (or other designated distance defining the perimeter of the warning zone), the system knows that the pet is in the warning zone and the static/audible correction unit 58 (FIG. 3) issues an audible correction to warn the pet that it is approaching the perimeter of the containment area.

Figure 13:
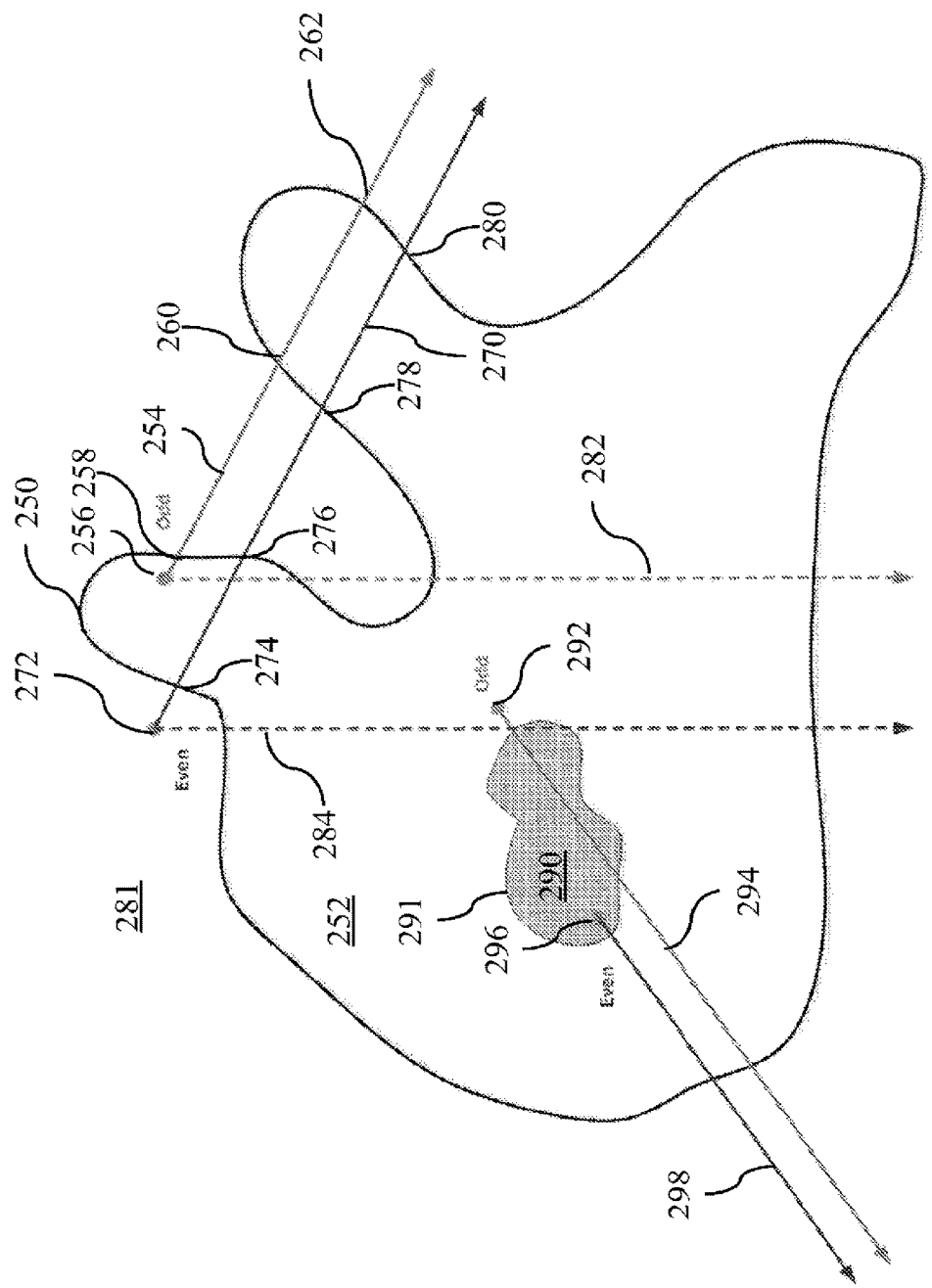
FIG. 13 is a diagram depicting a containment area and application of the ray casting according to this invention.

With this method, the preferred embodiment can quickly and reliably determine if the pet is in the safe zone, warning zone, or out of bounds zone. This approach is illustrated in FIG. 13 where containment perimeter 250 is shown to form safe zone 252. While a warning zone would be included, for simplicity it has been omitted from this example. In one example, ray 254 extending from location 256 in the direction of the closest portion 258 of the perimeter is shown to cross perimeter 250 at point 258, point 260 and at point 262, for a total of three crossing points. Since the number of crossing points is odd, the system will know that the pet at location 256 is in the safety zone 252. In another example, ray 270 extending from location 272 in the direction of the closest portion 274 of the perimeter is shown to cross perimeter 250 at point 274, point 276, point 278, and point 280, for a total of four crossing points. Since the number of crossing points is even, the system will know that the pet at location 272 is in the out of bounds zone 281.

As indicated by rays 282 and 284 (shown in phantom) it is not a requirement that the ray be cast to the closest portion of perimeter 250 from the locations 256 and 272. As depicted, rays 282 and 284 intersect perimeter 250 three (odd) and four (even) times, respectively, just as did rays 254 and 270.

Also shown in FIG. 13 is a second out of bounds zone 290 (such as a pond) having a perimeter 291 contained within safe zone 252. At location 292 a ray 294 is cast and intersects three points, two in perimeter 291 and one in perimeter 250, indicating that location 292 is in a safe zone. At location 296 a ray 298 is cast and intersects two points, one in perimeter 291 and one in perimeter 250, indicating that location 296 is in out of bounds zone 290.

GNSS Walking Error Correction

To accurately and effectively use the ray casting approach described above, the "true" GNSS position/coordinates of the pet must be known at all times during operation. If the raw, real-time output of the GNSS system is used, the system would be subject to the real-time errors. In order to correct for real-time errors, the real-time stream of GNSS positioning information is augmented with data from the Attitude and Heading Reference System (AHRS) 88 of the precision positioning unit 60. Moreover, the following approach can be used in the tracking mode as well to more accurately locate the position of the pet.

With GNSS systems, there are several bits of data that come out of the National Marine Electronics Association (NMEA) message string. Two important pieces of data are the Course over Ground (CoG) and Speed over Ground (SoG) values. Known GNSS systems can accurately predict the location of a moving object by knowing the previous CoG value, heading relative to North, and SoG value, speed in meters/second.

In addition, we track SoG and CoG for speed and heading and use the AHRS to compensate for any heading errors due to severe multipath of satellite signals. SoG and CoG are part of the GNSS data string; they come with every waypoint. We use the Gyroscope and Magnetometer in the AHRS to double check the CoG from the GNSS and double check whether the pet is moving or stationary. With GNSS systems, it is known that when the object/GNSS receiver is stationary, the subsequent calculated positioning information tends to "walk" around even though the receiver is motionless.

Such "walking" errors are due to the fact that the satellites in orbit continue to move as the receiver is stationary. This causes significant inaccuracies in the GNSS computation of where it is on earth. With these errors, when the pet is stationary, the GNSS module 86 may be outputting coordinates indicating that the pet is several meters away from its actual location. If the pet was stationary near a house or other reflective structure, that error would increase and potentially put the pet in the warning zone or out of bounds zone, and the pet would receive a correction even when it was really in the safe zone.

In the preferred embodiment, a method is used to augment real-time GNSS data and implement hysteresis to improve overall location accuracy of the collar by using the AHRS subsystem to determine whether the pet is in motion or stationary. Further enhancing the accuracy of the system is implementing hysteresis after the pet has left a no motion state.

The AHRS subsystem runs on an Attitude Engine and Extended Kalman Filter to provide the most accurate sensor data output. The filtered accelerometer output can be used in conjunction with the SoG value output from the GNSS and can reliably determine if the pet is in motion or stationary. However, in order to do that accurately, gravity compensation on the accelerometer of the AHRS subsystem must be performed. Accelerometers, due to their nature, measure both gravitational and linear acceleration in m/s/s. Here, only linear acceleration is needed, which we can then derive a linear displacement of the pet if it actually moved. Because accelerometers are not influenced by multipath signals, it provides the advantage of using it as a filter mechanism for the SoG value from the GNSS system because as multipath signals are observed, there will also be a SoG value>0 m/s that will also be observed.

The AHRS outputs raw acceleration which is the combined effect of acceleration due to gravity and any linear displacement. It is then necessary to subtract out the acceleration forces due to gravity thus leaving only linear acceleration. To do this, the AHRS has quaternion outputs q0, q1, q2, and q3 that are not affected by multipath effects. With these quaternion outputs one can perform quaternion math to subtract out the gravity vector in the raw acceleration values provided by the AHRS. Gravity compensation can be achieved by the following set of equations:

We first must obtain the direction of gravity in each axis where the quaternion output from the AHRS is referenced to LTP giving:

$$g(x)=2*(q1*q3-q0*q2);$$

$$g(y)=2*(q0*q1+q2*q3);$$

$$g(z)=q0*q0-q1*q1-q2*q2+q3*q3;$$

which provides results of g(x), g(y), and g(z) as unit vectors.

The unit vectors now must be scaled properly which can simply be done by:

$$g(x)\_scaled=g(x)\_raw/9.81$$

$$g(y)\_scaled=g(y)\_raw/9.81$$

$$g(z)\_scaled=g(z)\_raw/9.81$$

And finally we can achieve gravity compensated acceleration by:

$$g(x)\_comp=(g(x)\_scaled-g(x))*9.81$$

$$g(y)\_comp=(g(y)\_scaled-g(y))*9.81$$

$$g(z)\_comp=(g(z)\_scaled-g(z))*9.81$$

Now with linear acceleration only, it can be compared to the SoG value from the GNSS and accurately determine if the pet is in motion or stationary. This is highly critical when it comes to the accuracy of the system because as we know the GNSS information unfiltered tends to "walk" causing greater inaccuracies. With this critical information we can now combine augmentation and averaging techniques to the GNSS system and achieve greater accuracy.

Figure 14:
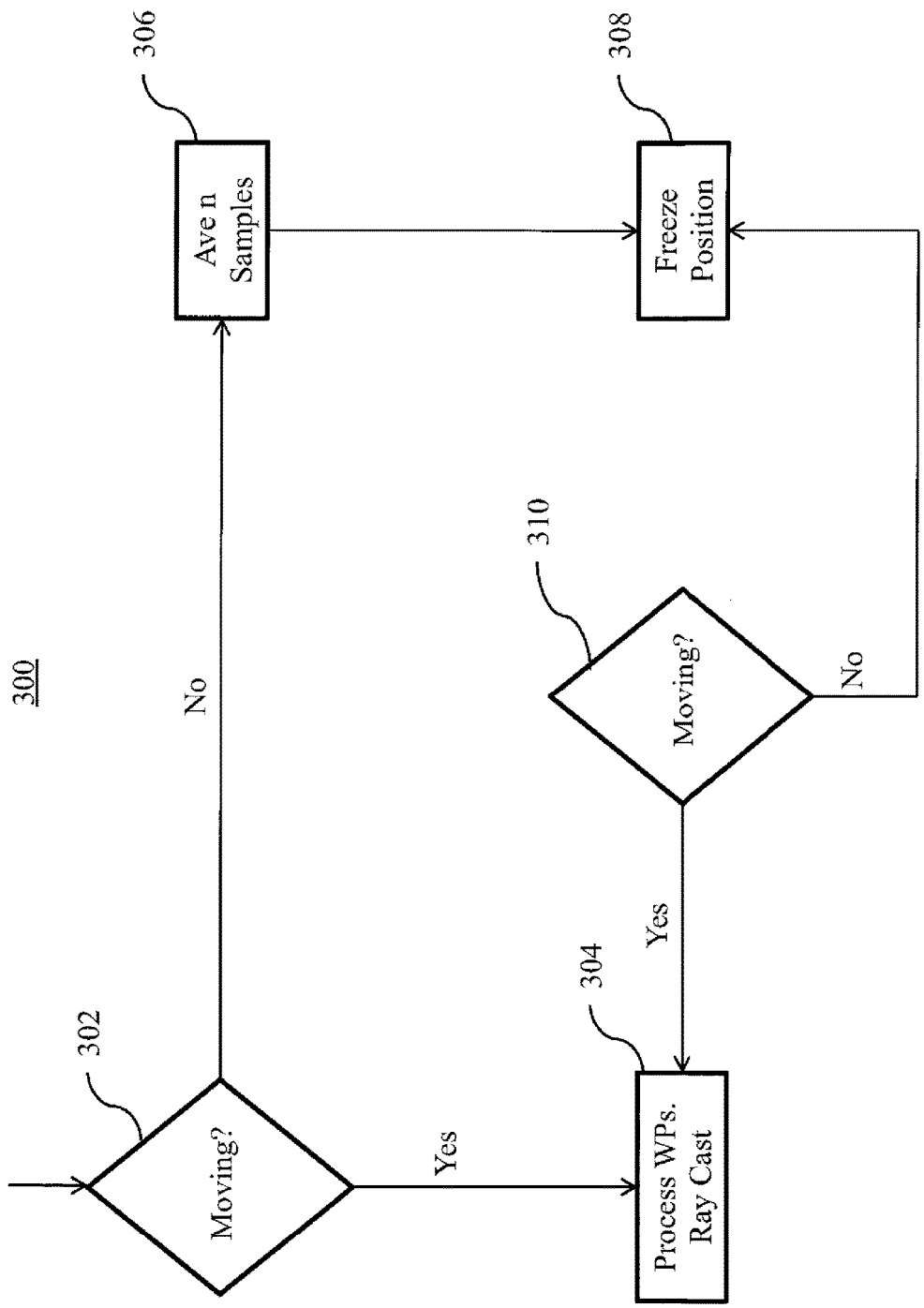
FIG. 14 is a flow chart depicting the method of correcting GNSS walking errors.

This process is shown in flow chart 300, FIG. 14. In step 302 it is determined each time period, t, if the pet is in motion, as described above, and at step 304 the GNSS real-time data output is used to accurately track the pet position using ray casting.

If at step 302 it is determined that the pet is not in motion, then at step 306 the next n samples, one obtained each of the next n time periods t of GNSS data, are averaged and at step 308 the system freezes the pet location at the averaged position. While the pet is not in motion, all subsequent positioning data from the GNSS is ignored and the pet's position is locked at the position corresponding to the average of the n samples. The system continues to check for pet movement at step 310 and if the pet continues to be stationary the position continues to be locked at step 308. If it is determined that the pet has begun to move again at step 310, the system reverts to position location using ray casting at step 304.

Therefore, the sequence of events as motion and no motion occur is the following:

Pet=in motion: Maintain real-time GNSS feed and monitor AHRS to determine if pet has stopped moving.

Pet=no motion: Flag no motion state, gain an average of n samples and lock position. This becomes new "true" position relative to the containment perimeter and ray cast distance is updated.

Pet=in motion after no motion: Flag motion state, implement hysteresis due to multipath (i.e. ignore initial new GNSS feed position readings to allow system to settle to more accurate readings after motion begins again), maintain real-time GNSS feed and monitor AHRS to determine if pet has stopped moving.

By using this method to accurately track the pet, it reduces the overall errors inherent in GNSS systems. It also provides a method to reduce local multipath errors which can be highly variable depending on the environment. As stated earlier, when the pet is near highly reflective objects like homes or urban canyons, the pet's position will move around even when it is not in motion. The error case is much larger in urban canyons where highly reflective glass material and tall buildings exists which can introduce errors in the tens or even hundreds of meters. To mitigate these errors whether in the containment perimeter or otherwise; the positioning engine will lock the position of the pet when it has sensed no motion. This prevents subsequent GNSS readings from moving the pet around when in reality it has not moved at all.

Adjustment for Structures in Containment Area

One major issue with GNSS systems is that when they are for positioning objects under structures, such as in homes, the signal quality is highly degraded and the positioning accuracy cannot be relied upon. With the preferred embodiment, a home, garage or another structure may be used as part of the containment perimeter.

Figure 15:
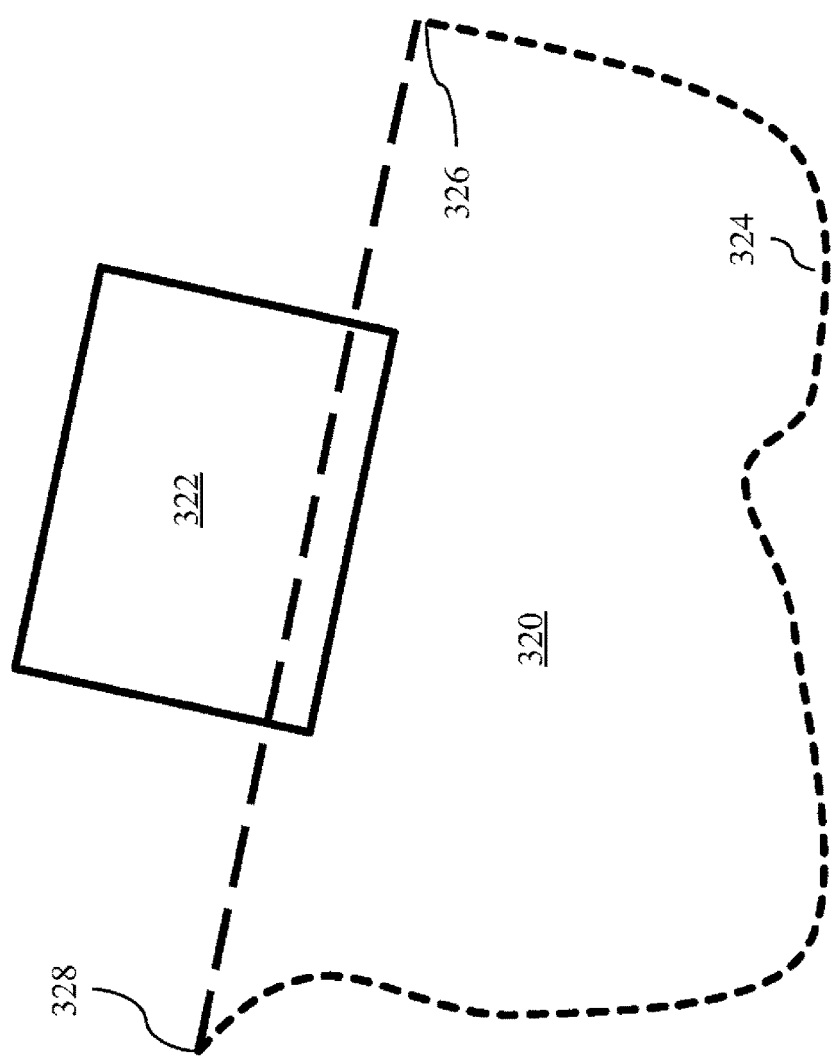
FIG. 15 is a top plan view of a containment area incorporating a structure.

As shown in FIG. 15 containment area 320 includes a house 322 as part of the containment perimeter 324. In this example the pet owner started on one side 326 of house 322 and ended on the opposite side 328 to complete the containment perimeter 324. Because the ray casting algorithm needs to cast to a simple polygon, the system automatically connects the start point 326 with the endpoint 328 by drawing a straight line.

Without implementing the adjustments according to this invention, if the pet walked into the garage or house and breached the perimeter that is drawn across the home, it would receive an audible and also a static correction. This is highly undesirable for the pet as the pet should be able to enter/exit the home freely without receiving corrections.

This is achieved by assessing the NMEA message string of all satellites that the GNSS receiver is in communication with and obtaining the Carrier-to-Noise (C/N0) ratio of each satellite. The system then averages all the C/N0s together to get the average C/N0 ratio. When the pet is outside and has view of most of the sky, the C/N0 values will be high and exceed a predetermined high threshold. As long as the total averaged C/N0 value remains above this threshold, the system will deem that the pet is outside and remains in normal containment operation.

In the event the pet walks inside the garage or home, the structure will severely attenuate the C/N0 value. The system will have a predetermined low threshold to indicate that the pet is indoors. If the threshold is crossed, the system will determine that the pet is indoors and the system will virtually "place" the pet in the containment perimeter 324 (e.g. proximate the center), notwithstanding its actual position, in order to prevent invalid corrections. The first and second thresholds are typically different values. In the event the pet does walk out of the house/garage and the C/N0 values exceed the high threshold for a minimum amount of time, the collar will deem the pet to be outdoors and will resume normal mode of operation.

This ensures the pet can safely enter/exit the homes and garages that have been intended to be part of the containment perimeter.

The logic flow in the method is as follows:
Total averaged C/N0>high threshold=pet is outdoors, normal containment perimeter.
Total averaged C/N0<low threshold=pet is indoors, normal containment perimeter, pet location is placed in center of containment perimeter.

By using this method, pet owners now have the ability to use their homes and garages as part of the containment perimeter. It offers an incredibly convenient, low cost, flexible, and highly custom method to develop a containment perimeter that blocks off either the front or back of the yard without routing needless wire into the ground and allows the pet to enter/exit the home/garage without receiving an audible/static correction.

What is claimed is:

1. A device configured to be disposed on a subject for use by an operator for maintaining the subject within a containment zone, the device comprising:
   A positioning unit for generating satellite positioning data corresponding to a position of the subject and motion data corresponding to the motion of the subject;
   A memory for storing containment zone data defining the containment zone:
   A processor unit, in communication with the positioning unit and the memory, configured to determine from the motion data, a linear acceleration of the subject and configured to determine from the satellite positioning data, the linear acceleration of the subject, and the containment zone data if the subject is inside the containment zone or if the subject has exited the containment zone; and
   A correction unit, in communication with the processor unit, configured to issue the subject a stimulus when the subject exits the containment zone.

2. The device of claim 1 wherein the positioning unit includes a global navigation satellite system receiver in communication with a plurality of satellite constellations to produce the satellite positioning data and wherein the positioning unit further includes an attitude and heading reference system configured to provide to the processor unit attitude and reference data regarding the subject; wherein the position data includes the attitude and reference data.

3. The device of claim 2 wherein the attitude and heading reference system comprises one or more of a gyroscope, accelerometer, and a magnetometer.

4. The device of claim 1 further including a communication unit, in communication with the processor unit, wherein the communication unit includes a cellular communications device configured to transmit an alert to an electronic device of the operator by way of a cellular communication network when the subject exits the containment zone.

5. The device of claim 1 wherein the correction unit includes a static circuit for issuing the stimulus to the subject, wherein the stimulus includes a static correction when the subject exits the containment zone, and wherein the correction unit further includes an audio speaker for issuing an audible correction when the subject is within a predetermined distance of a perimeter of the containment zone.

6. The device of claim 1 wherein when the subject has exited the containment zone, the processor unit is configured to allow the subject to return to the containment zone without causing the correction unit to issue a stimulus to the subject when the perimeter of the containment zone is crossed by the subject returning to the containment zone.

7. The device of claim 1 wherein the subject is one of an animal, a human, or an object.

8. The device of claim 1 wherein the device includes a collar.

9. The device of claim 1 further including a communication unit, in communication with the processor unit, wherein the communication unit includes a Bluetooth low energy (BLE) module configured to communicate with the electronic device of the operator or a BLE fob when the user is in close proximity to the subject wearing the device.

10. A method for an operator to maintain a subject within a containment zone, the method comprising:
   generating satellite positioning data and motion data by a positioning unit contained in a device worn by the subject; the position data corresponding to a position of the subject and the motion data corresponding to the motion of the subject;
   storing in memory contained in the device worn by the subject containment zone data defining the containment zone;
   determining from the motion data, a linear acceleration of the subject and determining from the satellite positioning data, the linear acceleration of the subject, and the containment zone data if the subject is inside the containment zone or if the subject has exited the containment zone; and
   issuing the subject a stimulus when the subject exits the containment zone.

11. The method of claim 10 wherein the step of generating position data includes using a global navigation satellite system receiver in communication with a plurality of satellite constellations to produce the satellite positioning data and wherein the step of generating position data includes using an attitude and heading reference system to provide attitude and reference data regarding the subject; wherein the position data includes the attitude and reference data.

12. The method of claim 11 wherein the attitude and heading reference system comprises one or more of a gyroscope, accelerometer, and a magnetometer.

13. The method of claim 11 further including a step of communicating by way of a Bluetooth low energy (BLE) module to the electronic device of the operator or a BLE fob when the user is in close proximity to the subject wearing the device.

14. The method of claim 10 further including a step of transmitting, using a cellular communications device, an alert to the electronic device of the operator by way of a cellular communication network when the subject exits the containment zone.

15. The method of claim 10 wherein the step of issuing includes using a static circuit for issuing the stimulus to the subject in the form of a static correction when the subject exits the containment zone, and wherein the step of issuing further includes using an audio speaker for issuing an audible correction when the subject is within a predetermined distance of a perimeter of the containment zone.

16. The method of claim 10 wherein when the subject exits the containment zone and then returns to the containment zone, the method further includes preventing the issuance of a stimulus to the subject when the perimeter of the containment zone is crossed by the subject returning to the containment zone.

17. The method of claim 10 wherein the subject is one of an animal, a human, or an object.

18. The method of claim 10 wherein the device is in the form of a collar.

* * * * *

Disclaimer

9,922,522 B2 - Kenneth S. Solinsky; Robert Paxton, both of Bedford, NH (US); Xinnakone Vivathana, Stratham, NH (US); Kristen Lomastro, Dover, NH (US); Scott Sterling, Boston MA (US). DEVICE AND METHOD FOR CONTAINING A SUBJECT USING SATELLITE POSITIONING DATA. Patent dated March 20, 2018. Disclaimer filed March 10, 2023, by the assignee, OnPoint Systems, LLC.

I hereby disclaim the following complete claims 1-18, of said patent.

*(Official Gazette, July 4, 2023)*